US010313404B2

(12) United States Patent
Ein-Gil et al.

(10) Patent No.: US 10,313,404 B2
(45) Date of Patent: Jun. 4, 2019

(54) SHARING USER CONTEXT AND PREFERENCES

(71) Applicant: Microsoft Technology Licensing, LLC, Redmond, WA (US)

(72) Inventors: Boaz Ein-Gil, Tzrufa (IL); Shimi Ezra, Petach Tikva (IL); Shira Weinberg, Tel Aviv (IL); Mikael Sitruk, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 411 days.

(21) Appl. No.: 15/198,675

(22) Filed: Jun. 30, 2016

(65) Prior Publication Data
US 2018/0007099 A1 Jan. 4, 2018

(51) Int. Cl.
*H04L 29/06* (2006.01)
*G06F 9/46* (2006.01)
*G06F 9/48* (2006.01)
*H04L 29/08* (2006.01)

(52) U.S. Cl.
CPC ............ *H04L 65/403* (2013.01); *G06F 9/468* (2013.01); *G06F 9/4856* (2013.01); *H04L 63/08* (2013.01); *H04L 67/14* (2013.01); *H04L 67/16* (2013.01)

(58) Field of Classification Search
CPC . H04L 41/0889; H04L 41/0859; H04L 41/22; H04L 65/403
See application file for complete search history.

(56) References Cited

U.S. PATENT DOCUMENTS 6,973,488 B1 * 12/2005 Yavatkar ............. H04L 63/0263
709/223
7,076,504 B1 7/2006 Handel et al.
8,046,437 B2 10/2011 Martinez et al.
(Continued)

OTHER PUBLICATIONS

"International Search Report and Written Opinion Issued in PCT Application No. PCT/US2017/039367", dated Oct. 9, 2017, 15 Pages.

(Continued)

*Primary Examiner* — Arvin Eskandarnia
(74) *Attorney, Agent, or Firm* — Shook, Hardy and Bacon, L.L.P.

(57) ABSTRACT

Technology for interoperability is disclosed by enabling the sharing of user context or preferences for a computing experience across computing devices, operating systems, applications, or locations. A platform and application programming interface (API) are provided for computer applications and services to store and retrieve context data associated with a computing experience. Access to the context data for sharing may be managed by an access controller, which enables a user to manage access permissions for the sharing of the context data. The context data may be defined according to a common schema, which specifies the information for sharing and may be communicated using common communication channels or protocols. Thus context data may be shared across nearly any application or service including those developed in different computer programming languages or operating on different types of computing devices or devices running different operating systems or by different software developers.

15 Claims, 7 Drawing Sheets

(56) References Cited

U.S. PATENT DOCUMENTS

| | | |
|---|---|---|
| 8,224,894 B1 | 7/2012 | Parks et al. |
| 8,402,147 B2 * | 3/2013 | Bondy ................ H04L 61/1588 370/400 |
| 8,683,334 B2 | 3/2014 | Potter et al. |
| 8,776,177 B2 | 7/2014 | Ferren et al. |
| 8,839,384 B2 | 9/2014 | Roy et al. |
| 8,959,192 B1 | 2/2015 | Liu |
| 9,104,507 B2 | 8/2015 | Knoodle |
| 9,576,092 B2 * | 2/2017 | Platzker ................ G06F 17/505 |
| 9,760,391 B2 * | 9/2017 | Kiess .................... G06F 9/5072 |
| 2005/0114479 A1 * | 5/2005 | Watson-Luke ........... G06F 8/71 709/220 |
| 2006/0123080 A1 | 6/2006 | Baudino et al. |
| 2007/0113273 A1 * | 5/2007 | Shafer ................... G06Q 10/06 726/11 |
| 2011/0225368 A1 | 9/2011 | Burge, III |
| 2011/0307551 A1 | 12/2011 | Danezis et al. |
| 2012/0066373 A1 | 3/2012 | Ochoa et al. |
| 2013/0226878 A1 | 8/2013 | Sankaranarayanan et al. |
| 2015/0172866 A1 | 6/2015 | Ghosh et al. |
| 2015/0242891 A1 | 8/2015 | Mimran |
| 2016/0063379 A1 | 3/2016 | Adderly et al. |
| 2016/0342722 A1 * | 11/2016 | Sentieys ............. G06F 15/7871 |

OTHER PUBLICATIONS

Hull, et al., "Enabling Context-Aware and Privacy-Conscious user Data Sharing", In Proceedings of IEEE International Conference on Mobile Data Management, Jan. 19, 2004, 12 pages.

Martínez-Villaseñor, et al., "Sharing and Reusing Context Information in Ubiquitous Computing Environments", In Proceedings of 13th Mexican International Conference on Artificial Intelligence, Nov. 16, 2014, pp. 227-230.

* cited by examiner

SHARING USER CONTEXT AND PREFERENCES

BACKGROUND

On an average day, a person typically uses multiple computing devices. Often the person will move from one device to another, preferring one or the other based on a particular task the person is trying to complete, the location of the user (e.g., whether the user is at home or driving somewhere), or the experience the person is seeking. For example, the person might begin reading an email on their phone only to continue reading and responding to it on a desktop computer.

But transitioning from one device to another is not seamless and often can be cumbersome, requiring the person to move the context herself from one device to another and apply the context to the new device. For instance, in the above example, the person needs to (1) launch the email application on their desktop computer, (2) locate the email message she was reading on her phone, (3) open the message, and (4) find the paragraph of the email message where she left off. Only then can the user get back to completing the task at hand.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards technology for improving interoperability by enabling the sharing of user context or preferences for a computing experience across client computing devices, operating systems, applications, or locations. A platform and application programming interface (API) are provided for computer applications and services to store and retrieve context data including user context or preferences associated with a computing experience. The user context may include information related to a task, such as reading email, being carried out on a computing device used by a user. User preferences may include settings, options, parameters, or other configurations associated with user experience, content, applications, services, or computing devices. The context data may be defined according to a schema, which specifies the information to be transferred across client computing devices, operating systems, applications, or locations for sharing context, and may correspond to a particular task or category of task, experience, or content, or a type of application, service, or device.

The platform may be cloud based and the context data may be shared across client computing devices (sometimes referred to herein as "user devices") over the Internet, in one embodiment. For example, as will be further described, the context data may be preserved in a cloud-based data store associated with the user. Using the API, applications and services running on clients with an Internet connection can access the data store, to store or retrieve the context data. The platform and API enable the sharing of the context data across nearly any application or service that may be used for a particular task, including applications or services developed using different computer programming languages and/ or operating on different types of user devices, or user devices running different operating systems. Thus, for example a user can begin a task on one device and complete it on another device seamlessly, allowing the user the freedom to choose the best application (sometimes called the "best of breed" application) on each device for the task. As a result, the user is no longer confined to continue using an inferior application or device when a better one becomes available or better fits the task at hand. In this way, embodiments of the present disclosure also facilitate interoperability and enable a user to 'feel right at home' when using a similar but different device, application or service.

Access to the data store may be managed by an access controller, which enables a user to manage access permissions or specify levels of access to the context data in the data store. In one embodiment, the access controller includes a set of access parameters specifying access to the context data according to criteria, such as the application type, client device, or location. A user may set or modify the access parameters through a user interface associated with the access controller.

Some embodiments further include an analytics layer that analyzes the context data or usage patterns for each user across devices in order to determine inferences about the user or usage patterns. The analytics layer may be used to determine typical user-preferences and access permissions associated with context data, which may be used to determine default setting or parameters. In some instances, based on the inferences, recommendations may be provided to users for an improved computing experience.

BRIEF DESCRIPTION OF THE DRAWINGS

Aspects of the disclosure are described in detail below with reference to the attached drawing figures, wherein.

DETAILED DESCRIPTION

Figure 1:
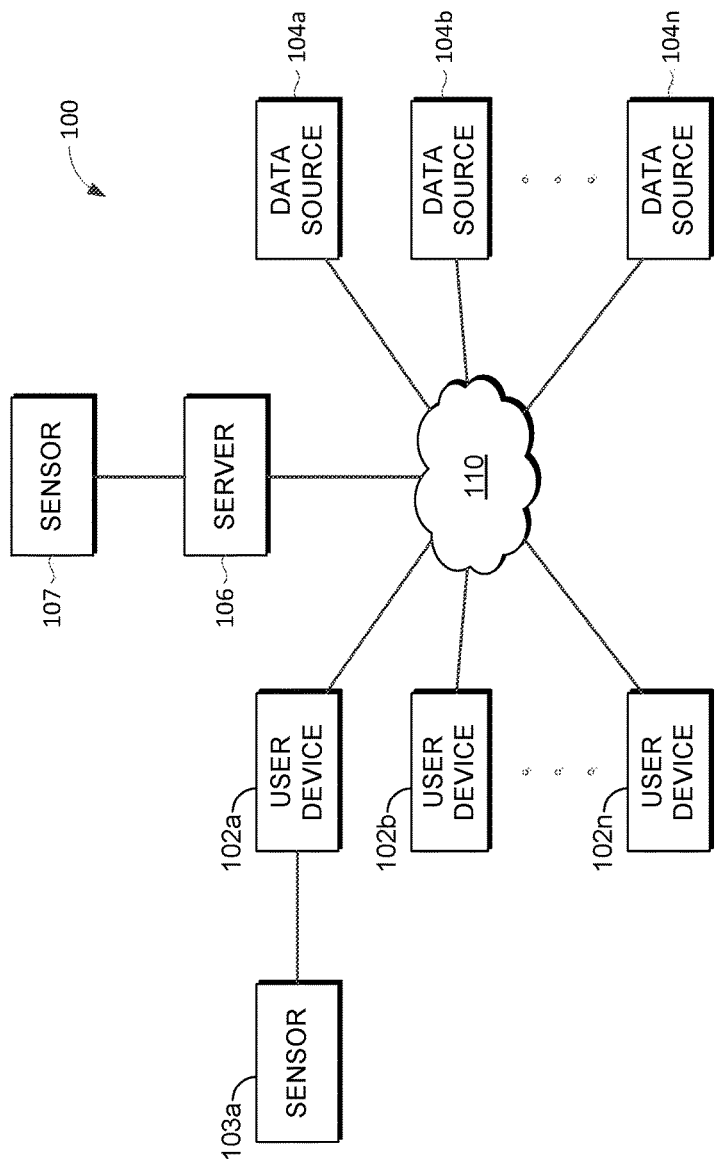
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure relate to technology for facilitating and improving interoperability by enabling the sharing of context data for a computing experience across computing devices (which may include virtual machines operating on different devices or the same device) operating systems, applications, or locations. The coalescence of telecommunications and personal computing technologies in the modern era has enabled, for the first time in human history, information on demand combined with a ubiquity of personal computing resources (including personal computing devices and cloud-computing coupled with communication networks). As a result, it is increasingly common for users to rely on multiple computing devices throughout the day for handling various tasks. But as described previously, users are generally unable to transition tasks, including their content and context (or preferences), from one device (or application or service) to another when needed or when desired, such as when a better device becomes available. In a large part, this is due to incompatibility or the inability of the applications, services, devices, platforms, or operating systems to seamlessly communicate with each other in order to transfer context data.

As the progression of technology continues its course, new, diverse, and often proprietary systems, content, applications, and services are continuously developed and released to users. These advances often provide advantages such as improved security, specialization, efficiency, aesthetic design, additional features, and other improvements or benefits, for example. This is why some users might prefer an iPhone to an Android phone, or some users might prefer a Windows computer to a Mac. But it is a challenging technological problem to enable interoperability among these technologies, such as the sharing of user context and preferences, because these technologies typically are not designed to interoperate and even may be developed without awareness of the other technologies for which interoperability is desired or needed. Moreover, addressing this problem typically requires significant coordination among developers and manufacturers; modifications or compromises in design, which may result in a slightly inferior product; and additional development time which can delay a products entry to market. So most of the time, users are unable to seamlessly share context or preferences.

As described previously, conventional approaches to reproducing context and content on separate devices, applications, or services often require a user to manually launch the application or service, access the content, and then reconfigure the application or service to produce a similar context. Some approaches to address these limitations include proprietary systems that enable a user to preserve context or transfer context to another device but only over a private, closed platform or within same application running on a different device. In other words, the client applications or services over which context is shared are controlled by (or developed by) the same entity. For example, a user may preserve her browser bookmarks for the Chrome browser application, such that the bookmarks are available when she accesses the Chrome browser application over another device. But a significant limitation to this approach is that it forces the user to use the same application (or service) on the different devices, while it is more than possible that the user may prefer a different application that serves the same purpose on different devices. In particular, the best of breed application (e.g., the best browser) may be different on different devices or platforms. For instance, a user might prefer using the iOS® native browser on her iPhone® while preferring to use Microsoft® Edge Browser on her Windows® laptop. Accordingly, some of the embodiments of this disclosure address these limitations and solve the problems arising from the disparate technology platforms, devices, operating systems, applications or services, by providing an improved technology for computing interoperability. As further described herein, such embodiments enable or facilitate the sharing of content and context across different applications, services, operating systems, platforms, or devices thereby solving these problems, providing users greater freedom to choose the best application or service on each device or platform for a particular task, and improving the resulting computing experience for the user.

Accordingly, a platform and API are provided for computer applications and computer services to store and retrieve the context data, which may include user context or user preferences associated with a computing experience. User preferences may include settings, options, parameters, or other configurations associated with user experience, content, applications, services, or computing devices. The user context may include information related to a task being carried out with a computing device used by a user (e.g., a user device) or other contextual information associated with a user session of a computer application, computing service, or user computing device. In some embodiments, context data may include information that corresponds to a state of a computing-device-provided experience, which may be associated with a user session of the application, service, or user computing device. By way of example and without limitation, the context data associated with a task of playing a song, via a music-playing application or service operating on a user device, might include information about the song being played including a track number, or title, or other song identifier; a source of the song (such as a file path, online address, streaming music account, or similar information specifying a computer-accessible location of the song file such that the song may be potentially accessed by another application, service, or user device); previous song(s) played; number of times this song has been listened to; a playlist of upcoming songs queued for play back; offset information indicating the present location of the song as it is played; user playback settings; such as visualization settings; audio equalization configurations; headphone or speaker configurations; volume; communication network connection(s) information; other settings, options, parameters, configurations or user preferences related to the task of playing or listening to music with the user device; information about user interactivity during the song playback, such as other applications accessed or websites browsed to, for example; or other contextual information associated with the user, the user device, or the playing of the song on the user device.

In an embodiment, context data associated with a task may be defined according to a schema, which specifies the information to be preserved for sharing context, and may correspond to a particular task or category of task, experience, or content, or a type of application, service, or device. In some embodiments, users, such as programmers or application developers, may define new schemas, which may be published to a repository or otherwise made available to other users in order to facilitate the sharing of user context or preferences for new applications or services or for new aspects of existing applications or services. In some instances, a new schema may be defined according to the API. Defining a new schema may also comprise updating the API to include new definitions, tools, or resources for handling context data corresponding to the new schema. Additional details and examples of schemas are provided in connection to FIG. 3 and schemas 230 of FIG. 2. A task may include nearly any job, function, or operation that may be performed by or carried out using a computing device or facilitated with a computing device. By way of example and without limitation, tasks may include checking or reading email, playing music or video, reading or writing a document, browsing the Internet, browsing or engaging with a social media platform, services provided by apps operating on a user device (e.g., a navigation/map app, a weather monitoring or forecast app, a calendar or scheduling app, etc.) monitoring or altering the user's environment such as adjusting lighting, heating or cooling the air, humidity, operating a vehicle or machine, or other actions that may be facilitated or carried out for a user by a computing device.

In an embodiment, the platform may cloud based and the context data may be shared across client user devices over the Internet. For example, the context data may be preserved in a cloud-based data store associated with the user. Using the API, applications and services running on clients with an Internet connection can access the data store, to store or retrieve the context data. Alternatively, in another embodiment as further described herein, a peer-to-peer platform may be utilized to share context data from a first device to a second device.

The platform and API enable the sharing of the context data across nearly any application or service that may be used for a particular task, including applications or services developed from different computer programming languages and/or operating on different types of user devices, or user devices running different operating systems. In this way, for example, a user can begin a task using a first application on a first device that is running a first operating system, and then continue the task on a second, different application operating on a second device running a different operating system that is a different type of device than the first device. For instance, a user listening to her favorite song in the car as she arrives home can turn off the car, go into her house, turn on her home audio system, and resume listening to the song at about the same point in the song where she left off when she turned off the car. (She no longer has to wait in the car until her favorite song finishes.)

Moreover, the user is no longer confined to continue using an inferior application, service, or device when a better one becomes available, and in particular, the user may use the 'best-of-breed' application on a particular device for performing a particular task. For instance, the best application for a particular task (or the application preferred by most users) on one device may be different than the best application on another type of device. (E.g., the native browser on iOS® by Apple® may be the preferred browser on devices running iOS®, but on devices running Microsoft® Window®, the Edge Browser may be the best or most preferred browser.) Accordingly, some of the embodiments described herein, enable a user to a user to 'feel right at home' when using a similar but different device, application or service.

As previously described, access to the data store may be managed by an access controller, which enables a user to manage access permissions or specify levels of access to the context data in the data store. Thus by way of example and without limitation, access may be managed based on the task; the particular application or service requesting access to context data; the type of application or service or other property of the application or service; the user device or type of user device that is seeking access to the data store (e.g., a phone, tablet, laptop, television, etc.); location of the device; time or date; the duration of time for which a user device, application, or service has accessed the context data (e.g., a user may want to set a time limit of 2 hours for which a hotel television can seek access context data for watching a movie); the number of previous accesses or requests to access context data (or the rate of access or requests to access) by an application, service, or device; the amount of context data that has previously been shared with the application, service, or user device; whether the user owns the device or if the device is being used by the user temporarily; whether the user device, application, or service has been provided access to the data store previously, and in some instances the level of access preciously provided (In some embodiments, upon requesting access to the user's data store by a device not previously recognized, the user may be prompted to provide authentication); a degree of confidence that the application, service, or device is legitimately authorized to receive the context data (e.g., where a request appears suspicious, only a limited amount of context data may be shared, such as context data that does not include sensitive or secure data about the user); whether other user devices, applications, or services that may be associated with the user are concurrently seeking access (or accessing) to the same context data or to other context data on the user's data store; network connection or communication properties associated with the user device; other properties associated with or nearly any other criteria related to the application, service, or user device. Accordingly, it is contemplated that a user may be provided a broad degree of control regarding how and to what level the data store is accessed or context data is shared. In one embodiment, the access controller includes a set of access parameters that specify the rules, conditions, permissions, or other logic for managing accessing the data store and/or updating or sharing the context data. In some instances, at least some access parameters may be configured to default settings.

A user may set or modify the access parameters through a user interface (UI) associated with the access controller. In one embodiment, the UI comprises a webpage accessible over the Internet. In another embodiment, the UI is provided via an application or service (including an Operating System service) on a client device, or may be part of an application or service associated with the particular task. (For example, a settings feature in the user's email application may include functionality enabling the user to modify or specify those access parameters associated with the task of email.) In one embodiment, the UI comprises a dashboard or control panel enabling the user to manage access parameters and/or visualize aspects of her context data sharing, such as real time instances of access or historical information indicating previous instances of sharing of context data to applications, services, or user devices.

Some embodiments further include an analytics layer, as further described herein, that analyzes the context data or usage patterns for each user across devices in order to determine inferences about the user or usage patterns. The analytics layer may be used to determine typical user-preferences and access permissions associated with context data, which may be used to determine default settings or parameters including access parameters. In some instances, based on the inferences, recommendations may be provided to users for an improved computing experience. For instance, a recommended application for a particular task, such as a more popular app, or an app with more functionality that may provide a better computing experience, may be suggested to the user.

Accordingly, at a high level, according to an embodiment, user data is received from one or more data sources. The user data may be received by collecting user data with one or more sensors or components on user device(s) associated with a user. Examples of user data, also described in connection to component 210 of FIG. 2, may include information about the user device(s), user-activity associated with the user devices (e.g., app usage, online activity, searches, calls, usage duration, and other user-interaction data), network-related data (such as network ID, connection data, or other network-related information), application data, contacts data, calendar and social network data, or nearly any other source of user data that may be sensed or determined by a user device or other computing device. The received user data may be monitored and information about the user, user interactions with a user device, or other user data may be stored in a user profile, such as user profile 240 of FIG. 2.

The user data may be used for identifying one or more user devices associated with a particular user and/or a type of user device used by the user, such as a smartphone, tablet, laptop, television, vehicle, appliance, virtual reality headset, etc. and/or in some instances other properties associated with a user device, such as whether the owns the device, whether it is public or shared device, rented, has a temporary association with the user (e.g., a tablet borrowed from a friend or a television in the user's hotel room). In some embodiments, as further described herein, a user may register user device(s) via an access controller component, such as access control manager 260 of FIG. 2. Additionally, the user data may be monitored for user context data associated with one or more tasks being carried out on a user device being used by the user. In one embodiment, context data associated with a current user session of an application or service is identified from the monitored user data. Aspects of the user session context data are identified and stored. For instance, the context data may be stored in a cloud-based data store that is associated with the user, such as in user profile 240 of storage 225 described in FIG. 2.

Specific aspects of the context data to be stored may be identified according to a schema corresponding to a particular task being carried out on the user device. For example, where the task is reading email, an email schema may be utilized that identifies specific aspects of context data to monitor and/or store, such as an identification of the current email message that the user is viewing, an offset indicating the position within the email message that the user has read to or viewed, and an email account identifier or data source of the email message. In some embodiments, the schema may specify additional context data to store such as preferences or other parameters associated with the application, service, or computing experience. For example and without limitation, specific settings or preferences associated with the application or service (e.g., the font or text size for the email example), the time that the user engaged in the task (such as a date-time stamp or series of date-time stamps, which may also be used for determining how long ago the user engaged in that particular task which may indicate that the context could be out-of-date or stale, when sharing the context data onto a second device, application or service), an amount of time the user has viewed the message or engaged in the task, information about the device, application, and/or service that the user is using to view the message, etc. Additional details of embodiments using schemas are provided in connection to FIG. 3, and schemas 230 of FIG. 2.

Figure 2:
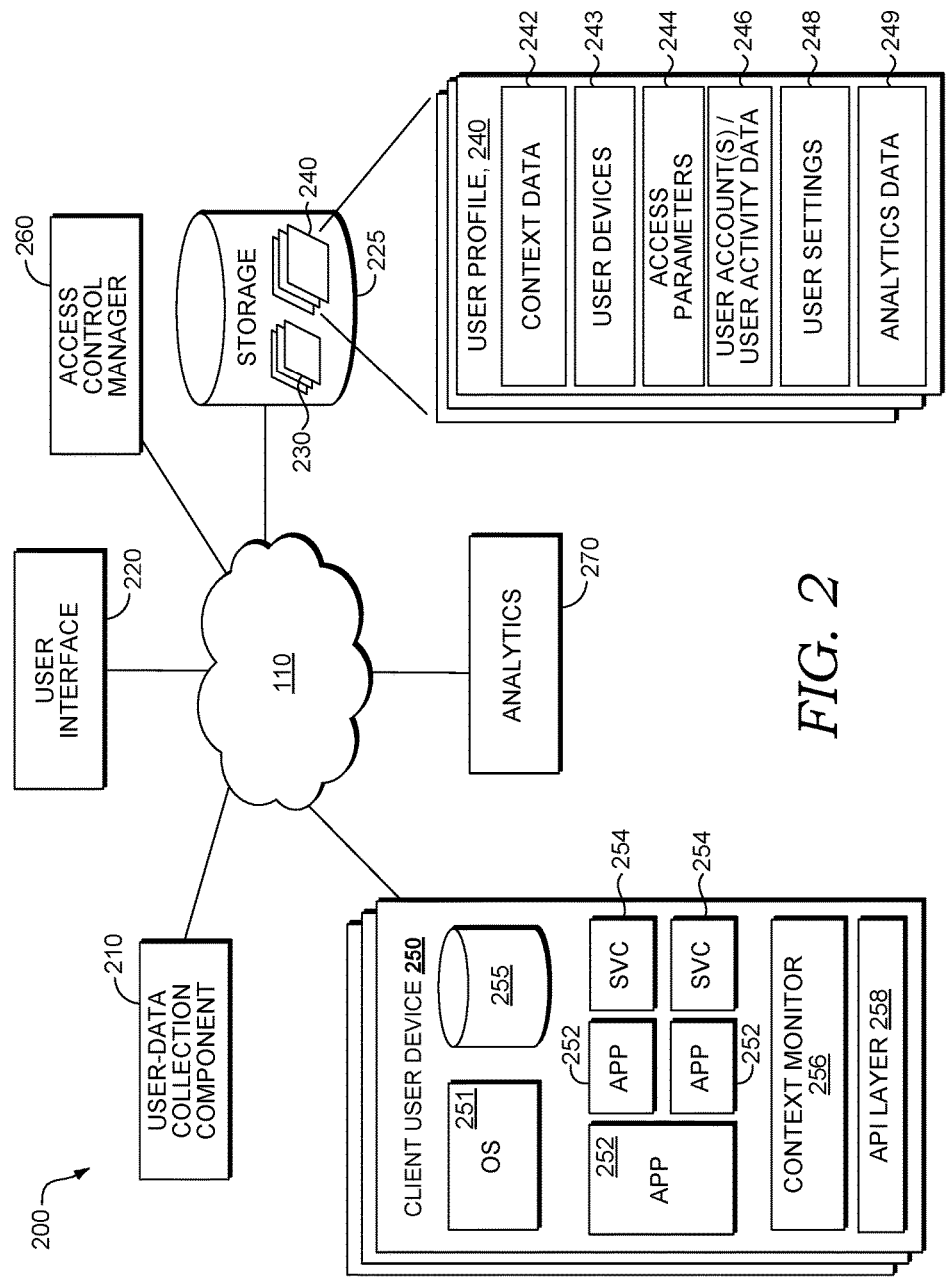
FIG. 2 is a diagram depicting an example computing architecture suitable for implementing aspects of the present disclosure.

In some embodiments, a client application or service being utilized for the task (such as an email client computer-application or -service) calls a context-monitoring service, such as user-task context monitor 256 described in FIG. 2, to identify and/or store the user session context data. The context-monitoring service may access or otherwise utilize a schema corresponding to the particular task in order to determine the specific context data to be stored. The context-monitoring service may be embodied as a feature of the client application or service handling the task (e.g., for the above email example, the email client computer-application or -service) or an application plug-in or add-on service, a service or routine of the operating system on the user device, or a stand-alone application or service operating on the user device or distributed across the user device and cloud. In some embodiments, the context-monitoring service may access an API Layer to facilitate formatting, transferring, and/or storing the context data to a cloud-based data store associated with the user, such as user profile 240 in storage 225 described in FIG. 2. In this way, the context data associated with current user session may be preserved for retrieval and use via another application or service, which maybe operating on a different user device. In some embodiments, authentication may be performed upon attempting to access the cloud-based data store. Additionally, in some embodiments, a set of access parameters may be utilized to determine a degree of access to be granted or limitations imposed on the access, such as access parameters 244 of user profile 240.

In a similar manner, at a high level and according to an embodiment, context data, associated with a task carried out during a first user session on a first device (or within a first application or service) and that is stored in the cloud-based data store, may be accessed and 'loaded' onto a second user device (or loaded into a second application or service on the first device) in order to recreate (or 'share') the user context or preferences from the first user session. In some embodiments, upon the user accessing a second application or service (such as a second email client application, which may be on a second device or on the first device), a call or request may be received to check for context data for the type of task(s) handled by the second application or service. (For instance, where a user started reading an email on her phone and now launches an email program on her laptop intending to resume carrying out the email task that started on the phone, the email program or other service or application on the laptop may request context data related to email.) For example, in one embodiment, the call may be requested by the second application or service and received by a context-monitoring service associated with the second device (or the second application or service), or the call may be requested by the context-monitoring service or another service operating on the device that detects access to the second application or service. Alternatively or in addition, an API layer may receive the request for the context data associated with the second application or service and facilitate access by the user device to the cloud-based data store associated with the user, in order to retrieve the context data from the first user session.

Upon attempting to access the cloud-based data store to retrieve context data, authentication may be performed. For example, in some embodiments the user may be required to authenticate using user identification, password, biometric information, device-ID for a registered user-device, or similar credential to validate the user and identify the data-store for that particular user from the data stores of other users. In some embodiments, once the user's data-store is identified and the user or the user device, application, or service requesting the context data has been authenticated, a set of access parameters is accessed. As described previously, a set of access parameters may be utilized to determine a degree of access to be granted or limitations imposed on the access of the context data. (Additional details are provided in the description of access parameters 244 of user profile 240 of FIG. 2.) For example, the access parameters may specify that only a portion of the requested context data may be provided to the second application or service. Similarly, the access parameters may provide the requested context data according to conditions or limitations, such as location of the user device hosting the second application or service, or for a limited duration or time. Thus by way of example and without limitation, a user may specify that a hotel television in the user's hotel room may receive context data, associated with a video the user is watching on her laptop, for three hours, or that a rental car may receive context data associated with the user's automobile preferences, but may not receive context data associated with the user's phone calls or email.

The context data may then be provided to the second computer application or service (or to an API layer on the user device of the second application or service, which then provides it) where it may be applied to this user session. In some embodiments, the context data is provided according to any access parameters, as described herein. The second application or service may receive the context data and reproduce the user context or preferences of the first user session based on the context data. Alternatively the operating system or a stand-alone application or service may receive the context data and facilitate its application to the second computer application or service, in order to reproduce the user context or preferences of the first user session.

In some instances, the second application or service (or second user device) may be incapable of utilizing all of the context information specified in the context data. In such instances, only the context data that is usable by the second application or service (or second user device) may be applied. For example, context data associated with the task of playing music may include information about audio equalization settings that may only be applicable for those music applications that have equalization functionality.

In embodiments that use a peer-to-peer approach for sharing context data from a first device to a second device, instead of a cloud-based data-store, the data-store may be stored on the user device. The context data may communicate from the first user device to the second user device without the intermediary step of the cloud-storage. Additionally, access parameters may be utilized in a similar fashion as described previously, but accessed from the first device (the sharing device). Thus only the context data that is permitted to be shared is communicated to the second user device. Additionally, some of the embodiments described herein may be carried out by a personal digital assistant (PDA) application or service, sometimes referred to as a "virtual assistant", which may be implemented as one or more computer applications, services, or routines, such as an app running on a mobile device or the cloud.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 700 described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 7 herein. By way of example and not limitation, a user device may be embodied as a personal computer (PC), a laptop computer, a mobile or mobile device, a smartphone, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized meter or measuring device, an appliance, a consumer electronic device, a workstation, or any combination of these delineated devices, a combination of these devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2.

Operating environment 100 can be utilized to implement one or more of the components of system 200, described in FIG. 2, including components for collecting user data; monitoring or determining user tasks, user activity and events, user patterns (e.g., (usage, behavior, or activity patterns), user preferences, context data, or related information to facilitate sharing context or to otherwise provide an improved user experience; generating personalized content; and/or presenting notifications and related content to users. Operating environment 100 also can be utilized for implementing aspects of methods 400, 500, or 600 in FIGS. 4-6, respectively. Referring now to FIG. 2, with FIG. 1, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Referring now to FIG. 2, with FIG. 1, a block diagram is provided showing aspects of an example computing system architecture suitable for implementing an embodiment and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, user interface 220, access control manager 260, one or more client user device(s) 250, analytics component 270, and storage 225. User-data collection component 210, analytics component 270, access control manager 260, aspects of user interface 220, and subcomponents of client user device(s) 250 including application(s) 252, service(s) 254, operating system 251, context monitor 256, and API layer 258 may be embodied as a set of compiled computer instructions or functions, program modules, computer software services, or an arrangement of processes carried out on one or more computer systems, such as computing device 700 described in connection to FIG. 7, for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 (including components 210, 260, 270, 256, 258, and aspects of 220) may be distributed across a network, including one or more servers (such as server 106) and/or client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowd-sourced data) for context monitor 256, API layer 258, access control manager 260, analytics component 270 or other components or subcomponents of system 200. The data may be received (or accessed), and optionally accumulated, reformatted and/or combined, by user-data collection component 210 and stored in one or more data stores such as storage 225, where it may be available to the components or subcomponents of system 200. For example, the user data may be stored in or associated with a user profile 240, as described herein. In some embodiments, any personally identifying data (i.e., user data that specifically identifies particular users) is either not uploaded from the one or more data sources with the user data, is not permanently stored, and/or is not made available to the components or subcomponents of system 200.

User data may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), client user device(s) 250, and/or other computing devices. As used herein, a sensor may include a function, routine, component, or combination thereof for sensing, detecting, or otherwise obtaining information, such as user data, from a data source 104a, and may be embodied as hardware, software, or both. By way of example and not limitation, user data may include data that is sensed or determined from one or more sensors (referred to herein as sensor data), such as location information of mobile device (s), mobile-device data (such as device state, charging data, date/time, configurations or settings, or other information derived from a mobile device), user-activity information (for example: app usage data; information regarding applications and services utilized or tasks performed on a user device and related contextual information such as usage time(s), files accessed, application configurations, online activity; searches; voice data such as automatic speech recognition; activity logs; communications data including calls, texts, instant messages, and emails; website posts; other user data associated with communication events; other user interactions with a user device, etc.) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon-.com®, Google®, eBay®, PayPal®, video-streaming services, gaming services, or Xbox Live®), user-account(s) data (which may include data from user preferences or settings associated with a personalization-related (e.g., "personal assistant" or "virtual assistant") application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein.

User data, particularly in the form of contextual information, can be received by user-data collection component 210 from one or more sensors and/or computing devices associated with a user. While it is contemplated that the user data is processed, by the sensors or other components not shown, for interpretability by user-data collection component 210, embodiments described herein do not limit the user data to processed data and may include raw data. In some respects, user data may be provided in user-data streams or signals. A "user signal" can be a feed or stream of user data from a corresponding data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, or as needed.

Example system 200 includes one or more client user device(s) 250. Client user device 250 may comprise a user computing device such as computing device 700 described in connection to FIG. 7, and may be embodied as a user device 102a through 102n described in FIG. 1. Some embodiments of this disclosure contemplate that client user device(s) 250 may comprise a set of client user devices (e.g., 102a through 102n) associated with a user, such as one or more mobile devices (e.g., smartphone, tablet, laptop, etc.) used by the user, desktop computer, game/home-entertainment system, smart TV, vehicle computer system, smart thermostat, home-automation computing device, or other examples of user devices 102a through 102n described in connection to FIG. 1.

As shown in example system 200, user client device 250 includes operating system 251, local storage 255, one or more applications 252, services 254, context monitor 256, and API layer 258. It is contemplated that some client user devices 250 may include other components not shown, such as communication components, power-related components, or other hardware and/or software components typically found on user computing devices. Further, it will be understood that the components 251, 255, 252, 254, 256, and 258 illustrated in FIG. 2 are exemplary in nature and in number and should not be construed as limiting. Any number of components may be employed to achieve the desired functionality within the scope of embodiments hereof.

Operating system 251 comprises the system software that manages and computer hardware or software resources of client user device 250 and provides common services for computer programs such as applications 252, services 254, context monitor 256, and API layer 258. Operating system 251 may be a single-task or multi-task operating system. By way of example and without limitation, examples of operating systems 251 may include Microsoft Windows, Microsoft Windows Mobile, Google Android, Google Chrome, Apple iOS, Apple OSX, Linux, Nokia Symbian, Blackberry OS, etc. Where example system 200 includes more than one, client user devices 250, it is contemplated that in some embodiments operating system 251 may be a different operating system for at least some of the client user devices 250. For example, a set of client user devices associated with a user may include a smartphone running Google Android, a iPod touch running Apple iOS, and a laptop running Microsoft Windows 10.

Client user device 250 includes one or more applications 252 or services 254. Applications 252 and services 254 comprise one or more computer programs, software services, or routines that operate on client user device 250. In some embodiments, applications 252 or services 254 may be standalone computer programs that run on client user device 250 and are supported by operating system 251. For example and without limitation, application 252 may comprise an app installed by the user, such as a music-playing application, a video player, or a web browser. Some applications 252 or services 254 may also be integrated into operating system 251. For instance, services 254 may include services or routines that are built into the operating system, such as (without limitation) configurations, user preferences, communications services, user interface services, or security settings.

In some embodiments, an application 252 or service 254 may be utilized by a user to carry out or facilitate a task. For example, and without limitation, an application 252 or service 254 may be used for checking or reading email, other communication (e.g., instant messaging), playing music or video, reading or writing a document, browsing the Internet, browsing or engaging with a social media platform, navigation/geography, monitoring a weather forecast, calendar or scheduling, monitoring or altering the user's environment such as adjusting lighting, heating or cooling the air, humidity, operating a vehicle or machine, or other applications, services, or tasks carried out for the user. It is also contemplated that a client user device 250 may include more than one application 252 or service 254 for handling a particular task, such as more than one web browser or music player. Additionally, different client user devices 250 may include different applications 252 or services 254 for handling tasks; for example, a smartphone client user device may include a native email application 252, and a laptop client user device may include a Microsoft Outlook email application 252. In some instances, an application 252 or service 254 may have user preferences, such as settings, options, parameters, or configurations, which may be associated with carrying out a task or may be used for configuring the functionality of the application 252 or service 254.

Context monitor 256 is generally responsible for monitoring user data and determining context data. For example, embodiments of context monitor 256 monitor user data received from user-data collection component 210, which may include data associated with a client user device 250 or related information including data associated with an application 252 or service 254 installed or running on a client device 250, or other user data that may be used for facilitating determining context data. As described previously, context data may include user context or user preferences associated with a computing experience. Thus in some instances, context data may be associated with an application 252 or service 254 performing a task. The context data may also include other contextual information associated with a user session of application 252, service 254, or client user device 250. In some embodiments, context monitor 256 monitors or determines context data according to a schema 230, as further described herein.

In some embodiments, context monitor 256 extracts context data and other contextual information from user data received from user-data collection component 210. For example, context monitor 256 may receive user data, parse the data, in some instances, and identify and extract context features or variables according to a schema. In some embodiments, context monitor 256 extracts information via screen scraping (or screen grabbing), keylogging, scanning memory, monitoring or analysis of operating system activity, or scanning communication(s). (Thus, in some embodiments, optical character recognition may be utilized. In some embodiments, semantic analysis may be performed, which may use a semantic knowledge base.) In some embodiments, the context data features or variables are stored as a related set of contextual information associated with a user session or task being carried out via an application 252, service 254, or client user device 250. In some embodiments, context monitor 256 (or access control manager 260 or analytics component 270) may determine interpretive data from received user data. Interpretive data corresponds to data utilized by these or other components (or subcomponents) of system 200 to interpret user data. For example, interpretive data can be used to provide additional context to user data. For example, in some embodiments interpretive data comprises statistical data, inferences, or determinations made from raw user data or other sensed user data. Moreover, it is contemplated that embodiments context monitor 256 or other components of system 200 may use user data and/or user data in combination with interpretive data for carrying out the objectives of the subcomponents described herein.

As further described herein, the context data extracted or otherwise determined by context monitor 256 may be provided to a data store 225 (or local storage 255 for embodiments implementing a peer-to-peer platform), where it may be stored in context data 242 or a user profile 240, to facilitate the sharing of the context data across devices, applications, services, or locations. In some embodiments, context monitor 256 (or another service of system 200, not shown) performs conflation on the context data. For example, overlapping information may be merged and duplicated or redundant information eliminated.

In various embodiments, context monitor 256 may be embodied as a component on a client user device 250, as shown in example system 200, such as a stand-alone application or service, as part of a stand-alone application or service, or as part of operating system 251. Alternatively or in addition, context monitor 256, or aspects thereof, may be incorporated into an application 252 or service 254. Context monitor 256 may also be embodied as a cloud-based service or as a distributed service that operates in the cloud and on one or more client user devices 250.

In some embodiments, an application 252 or service 254 calls context monitor 256 to determine context data for a user session of the application 252 or service 254, and in some instances to facilitate storing or retrieving of context data from or for the application 252 or service 254. In some embodiment, the storing or retrieval of context data is carried out by API layer 258, as described below. In some embodiments, a request for context data may be received by context monitor 256 from access control manager 260, from another client user device 250, or from an application 252 or service 254 on another client device 250. For instance, such a request may be received upon determining that a user has initiated a second user session on a second client user device 250, a second application 252 or a second service 254. In some embodiments, after determining context data (which may be determined according to a schema), context monitor 256 provides the context data to API layer 258 (or calls API layer 258). As described below, API layer 258 facilitates communicating the context data to the user's data store, such as context data 242 in user profile 240 on storage 225.

Similarly, a request to identify and preserve context in a first user session may be received upon detecting that the user is no longer using the client user device 250 or is about to turn it off. For example, upon detecting the user has set down their phone, turns off her screen, logs off/out, etc., the context data of the user session on the phone may be determined via context monitor 256 and then stored in context data 242 of storage 225. Similarly, upon detecting that the user has arrived at work, at home, or other locations where the user has previously switched client user devices 250, applications 252, or services 254 (as may occur when the user arrives to work or arrives home), then context data of the user session determined via context monitor 256 and stored in context data 242 of storage 225 so that it can be accessed to recreate the context in a second user session, such as a second user session on the user's work computer (a second client user device 250). In one embodiment, the detection may be facilitated using one or more sensors, such as sensors 103*a* or 107, described in connection to FIG. 1.

In some embodiments, context data may be identified by context monitor 256 and stored continuously (e.g., as it changes during the first user session); periodically; according to user settings, which may be specified in user setting 248; based on a determined likelihood that the user is about to (or has) started using another client user device 250, application 252, or service 254; or as needed. In some embodiments, context data may include a date-time stamp (or value) indicating the time at which the context data was captured by context monitor 256. The date-time stamp may be used to determine the most recent context data, as well as an indication of the staleness of the context data. The staleness may be useful where a significant amount of time has passed between user session that share the context. In such a circumstance, it may be assumed that the context might have changed but was not preserved, and thus recreating the context from an older user session may not be desired. Accordingly, in some embodiments, where a significant amount of time (e.g., more than 2 weeks, for example) has elapsed from when context data was preserved for the first user session, the user may be prompted regarding whether to apply context from that first user session. In one embodiment, the prompt includes providing to the user a date and/or time indicating the date/time that the context was preserved from the first user session.

In some embodiments, only the most recent context data is preserved in context data 242. The context data may be stored in a user profile associated with the user, such as in context data component 242 of user profile 240 in storage 225. Alternatively or in additional, context data may be stored locally on a client user device 250 in location storage 255. Context monitor 256 may access API layer 258 to facilitate formatting, transferring, and/or storing or retrieving context data to or from a data store, such as context data 242 or user profile 240 in storage 225.

API layer 258 is generally responsible for connecting an application 252, service 254 on client user device 250 to a data store associated with the user such as user profile 240 in storage 225 (or for facilitating access by an application 252, service 254 or other component operating on a client user device 250, such as context monitor 256, to context data 242 in the data store). The term access, as in accessing data, is used broadly herein and may include without limitation, reading, writing, receiving, requesting, communicating, transferring and/or other similar operations. (In some embodiments, the level or degree of access to the context data 242 or other data in storage 225 (or local storage 255) is controlled by access control manager 260, and may be specified by a set of access parameters, as further described herein.)

In some embodiments, API layer 258 may facilitate formatting, requesting, communicating or transferring, and/ or storing context data in the user's data store (e.g., in context data component 242 of user profile 240). The context data may be determined by context monitor 256, as described previously. API layer 258 may receive context data to be stored in user profile 240 (e.g., the user' data store) from context monitor 256, such as may occur when user context or user preferences is to be preserved. API layer 258 may also or alternatively receive a request for context data stored in the user profile 240 by context monitor 256 (or directly from an application 252 or service 254 on client user device 250), such as may occur when user context or user preferences are to be retrieved and loaded (or otherwise applied) to a new user session on another application 252, service 254, or client user device 250.)

In some embodiments, API layer 258 exposes a simple to use API on top of common communication channels and protocols such as Representational State Transfer (REST) over HTTP(S), Simple Object Access Protocol (SOAP), or similar protocol. Data may be sent or received as JSON, CSV, RSS, XML, msgpack, Protocol Buffers, or other suitable data formats, for example, and may be structured based in part on a schema 230 (described below). In this way, API layer 258 may be accessible from nearly any application 252 or service 254 (including context monitor 256) running on top of an operating system 251 or platform an nearly any client user device 250, so long as Internet connectivity is available (or another suitable communication means, including, for example, direct or peer-to-peer communication channels).

In some embodiments, access to context data 242, or other information stored in the user's data store such as user profile 240, is controlled by access control manager 260. API layer 258 also may facilitate user authentication via the access control manager 260, and/or may access data store 225 (or local data store 255, in some embodiments) according to a level of access permission provided by access control manager. For instance, API layer 258 may accesses context data 242 through the access control manager 260. Or more specifically, access control manager 260 may receive a request from API layer 258 and provide access according to permissions.

Access control manager 260 is generally responsible for controlling or managing access to the user's data (including context data), which may be stored in a data store associated with the user, such as in user profile 240 stored in cloud-based storage 225 (or in local storage 255, in some embodiments). In some embodiments, access control manager is responsible for performing authentication and/or authorization (such as read and/or write access or other levels of authority), as described herein. Access control manager 260 generally enables a user to manage access permissions or specify levels of access to the use's information. Some embodiments provide a granular control over access according to a set of access parameters 244. In this way, access control manager 260 may ensure that the user information remains private and the user is able to control who/what, when, where, or how the information can be accessed.

Access control manager 260 may be cloud-based or may be distributed across the cloud (or server side) and client-side or system 200. In the distributed embodiments, some aspects of access control manager 260 may be performed by client user device(s) 250. As described previously, in some embodiments, access control manager 260 may receive a request to access a user's information (for example a request to receive or update context data to the user's data store) from API layer 258. In response to the request, access control manager 260 may utilize a set of access parameters 244 associated with the user to determine the level of access to be provided. The access parameters 244 generally specify rules, conditions, permissions, or other logic for managing access the user's information, such as requesting, uploading, or sharing the context data 242. In some embodiments, a user may set or modify access parameters 244 through a user interface 220, as further described herein. At least some access parameters 244 also may be configured to default settings or values, in some instances. Alternatively or in addition, some access parameters may be learned or inferred from the user or from other users (e.g., through crowd sourcing, which may be facilitated using analytics component 270)

In one embodiment, access parameters 244 include a rule set that includes a user ID (e.g., an ID of the user whose information access is requested); a rule type indicating whether to allow or deny access, access type (e.g., read or write access); an information category corresponding to the task that the content data may be shared (e.g., email, web browsing, music, video, etc. or "all" categories); a client user device id, which may comprise a unique device ID or a class (or type) of device requesting the access; an Application ID, which may comprise a unique ID or category of the application requesting access; location information indicating the location or the device from which the access request originates (e.g., Geo coordinates); and time, which may specify an allowed time of day, date, or duration for access.

Access parameters 244 also may comprise other rules, conditions, or logic for use in controlling access. By way of example and without limitation, access may be managed using access parameters 244, based on the task; the particular application 252 or service 254 requesting access to context data 242; the type of application 252 or service 254 or other property of the application 252 or service 254; the client user device 250 or type of user device that is seeking access to the data store (e.g., a phone, tablet, laptop, television, etc.); location of the client user device 250; time or date; the duration of time for which a client user device 250, application 252, or service 254 has accessed (or may access) the context data (e.g., a user may specify a time limit of three hours for which a hotel television can seek access to context data 242 for watching a movie); the number of previous accesses or requests to access context data 242 (or the rate of access or requests to access) by an application 252, service 254, or client user device 250; the amount of context data 252 that has previously been shared with the application 252, service 254, or client user device 250; whether the user owns the client user device 250 or if the device 250 is merely being used by the user temporarily; whether the client user device 250, application 252, or service 254 has been provided access to the context data (or the user profile 240) previously, and in some instances the level of access previously provided; a degree of confidence that the application 252, service 254, or client user device 250 is legitimately authorized to receive the context data 242 (e.g., where a request appears suspicious, only a limited amount of context data 242 may be shared, such as context data that does not include sensitive or secure data about the user. Similarly, upon requesting access to the user's data store by a device not previously recognized, the user may be prompted to provide authentication); whether other client user devices 250, applications 252, or services 254 that may be associated with the user are concurrently seeking access (or accessing) to the same context data 242 or to other context data 242 on the user's data store (i.e., user profile 240); network connection or communication properties associated with the client user device 250; other properties associated with or nearly any other criteria related to the application 252, service 254, or client user device 250. In some embodiments, in response to a request context data 242, access control manager 260 may determine a portion or subset of the context data 242 to be provided based in part on the requesting client user device 250, application 252, or service 254 and the rules or conditions specified in access parameters 244 that are relevant to the requesting client user device 250, application 252, or service 254. In some embodiments, the subset of the context data 242 to be provided may be further based on characteristics of the requesting client user device 250, application 252, or service 254. Accordingly, it is contemplated that through access parameters 244 and access control manager 260, a user may be provided a broad degree of control regarding how and to what level the user's information (including context data) is accessed or shared.

Access control manager 260 also may perform authentication upon a request or attempt to access the user's information. For instance authentication may be performed on the user, or more specifically the application 252, service 254, or client user device 250 requesting access. In some embodiments, a user may be authenticated (or an access request may be authenticated) according to credentials, which may be supplied by the user (or by an application or service on the client user device 250), and validated based on information stored in access parameters 244. In such embodiments, the credentials may include information identifying and validating a user (such as a User ID and/or password, biometric information identifying the user (e.g., iris scan, fingerprint, voice recognition, facial recognition, etc.), or other means of identification or authentication. In an embodiment, in response to receiving a request for access to context data, access control manager 260 may issue an authentication challenge to the client user device 250 requesting access. The authentication challenge may comprise: a prompt asking the user to supply credentials (such as a password, biometric data, or other identifying information as described herein); a request for an authentication token from the client user device 250; an interrogation, performed by a software service, of the client user device 250 (or the application 252 or service 254 requesting access); or other information for authentication or validating legitimacy of the request.

In some embodiments, the credentials may include a device ID for registered or known client user devices associated with the user. Where a particular client user device 250 (or a particular application 252 or service 254) is unknown to access control manager 260 (or based on user configuration of access parameters 244) a user may be prompted for permission upon access of the user's information by that client user device 250 (or application or service). The prompt may take the form of a notification or query for the user's credentials, in one embodiment. Authentication settings may be configured by the user (or set by default) and included in access parameters 244. A user may modify or set the authentication settings of access parameters 244 via user interface 220, in one embodiment as further described herein.

Some embodiments of access control manager 260 include information about the client user devices 250 associated with a user, which may be stored as one or more data records in user devices 243 of user profile 240. In some embodiments, a user may declare or register her client user device(s) 250 (or applications 252 or services 254) with access control manager 260. For example, a user may provide information that identifies a particular client user device via user interface 220, or may optionally register a user device upon first accessing context data 242 or access control manager 260 (and in some instances following authentication by access control manager 260). Similarly, a user may log into an account via the client user device 250, install an application or service that includes device registration functionality on the client user device 250, connecting to an online service that interrogates client user device 250, or otherwise providing information about the client user device to access control manager 260 or a related application or service. In some embodiments devices that sign into an account associated with the user, such as a Microsoft® account or Net Passport, email account, social network, or the like, are identified and determined to be associated with the user. In some embodiments, a client user device 250 may register (or confirm registration) with access control manager 260 upon first requesting or receiving context data, and based on access parameters 244 the client user device 250 may be required to periodically re-confirm registration.

In some embodiments, access control manager 260 and/or context monitor 256 (or another application or service operating on client user device 250) monitors user data received from user-data collection component 210 for information user device information that may be used to identify a client user device 250. The user data may be used for identifying one or more user devices associated with a particular user and/or a type of user device used by the user, such as a smartphone, tablet, laptop, television, vehicle, appliance, virtual reality headset, etc. and/or in some instances other properties associated with a user device, such as whether the owns the device, whether it is public or shared device, rented, has a temporary association with the user (e.g., a tablet borrowed from a friend or a television in the user's hotel room).

In one embodiment, access control manager 260 (and/or context monitor 256, in some embodiments such as embodiments where context monitor 256 is distributed or cloud-based) includes a device identifier component (not shown) for identifying user devices associated with a particular user. In some embodiments, the device identifier identifies a set of one or more devices by monitoring user data for user-device related information. In some implementations, a client user device 250 may be identified by detecting and analyzing characteristics of the user device, such as device hardware, software such as operating system (OS), network-related characteristics, user accounts accessed via the device, and similar characteristics or device features. For example, information about a user device may be determined using functionality of many operating systems to provide information about the hardware, OS version, network connection information, installed application, or the like.

The device features of a particular client user device 250 may be used by to identify the client user device 250 or to classify the particular device type. Some embodiments may use as many device features as are available, able to be determined, or needed for the identification and/or classification.

Without limitation, examples of device features may include: time related features, such as time(s) of day(s), day of week or month the device is used by the user, or length of usage; device characteristics, such as device type (e.g. desktop, tablet, mobile phone, fitness tracker, heart rate monitor, etc.) hardware properties or profiles, OS or firmware properties, (which may include OS- or firmware-related information, OS level account(s), user-level accounts, and/or administrator-level accounts associated with the device, which may be present in an enterprise environment indicating the device is work-related), device IDs or model numbers, network-related information (e.g. mac address, network name, IP address, domain, work group, information about other devices detected on the local network, router information, proxy or VPN information, other network connection information, etc.); usage related features, such as app usage (which may also include application data), network usage information, or online activity (e.g. searches, browsed websites, purchases, social networking activity, communications sent or received including social media posts, user device settings information, user account(s) accessed or otherwise used (such as device account(s) or online/cloud-services related account(s), such as Microsoft® account or Net Passport, online storage account(s), email or social networking accounts, etc.). Device features may also include information about user(s) using the client user device 250; other information identifying a user, such as a login password, biometric data, which may be provided by a fitness tracker or biometric scanner; and/or characteristics of the user(s) who use the device. For example, if such features indicate diversity of usage (such as one batch of searches for Hello Kitty and another batch of searches for chi-squared distributions), then the particular client user device 250 is more likely a shared device used by more than one user, which may affect the level of access to context data (or other user information) provided to the client user device.

Some embodiments of the device identifier determine a device name or identification (device ID) for each device associated with a user. This information about the identified user devices associated with a user may be stored in a user profile associated with the user, such as in user's devices 243 of user profile 240. In an embodiment, the user devices may be polled, interrogated, or otherwise analyzed to determine information about the devices. This information may be used for determining a label or identification of the device (e.g. a device id) so that the user interaction with device may be recognized from user data by access control manager 260 (or in some embodiments by a context monitor 256).

Continuing with FIG. 2, example system 200 also includes user interface 220, which may comprise a graphical user interface (GUI) or other user inter interface(s), and may further include one or more applications or services on a client user device 250, across multiple client user devices 250, or in the cloud. For example, in one embodiment, user interface 220 includes functionality for managing the presentation of content to a user (or receiving of user input form a user) across one or more client devices associated with that user. In some embodiments, user interface 220 includes functionality for generating or presenting GUI features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, user interface 220 may be utilized for prompting the user for authentication information or managing access to context data (e.g., setting or modifying access parameters 244).

In particular, in some embodiments, user interface 220 may be associated with access control manager 260 or used for configuring access permissions of access control manager 260. For instance, a user may set or modify access parameters 244 through user interface 220. In one embodiment, user interface 220 comprises a webpage accessible over the Internet. In another embodiment, user interface 220 is provided via application or service on a client user device 250 (including as part of operating system 251), or may be part of an application 252 or service 254 associated with the particular task. For example, in an embodiment, a settings feature in a user's email application 252 may include functionality enabling the user to modify or specify those access parameters 244 associated with the task of email. In one embodiment, user interface 220 comprises a dashboard or control panel enabling a user to manage access parameters 244 and/or visualize aspects of her context data sharing, such registered or known user devices (or applications 252 or services 254) and their corresponding level of access permission; device type or category and corresponding level of access permission; real time instances of access to context data or historical information indicating previous instances of access or sharing of context data to applications 252, services 254, or client user devices 250.

Example system 200 also includes storage 225 and local storage 255. Storage 225 (and in some instances local storage 255) generally stores information including data, computer instructions (e.g., software program instructions, routines, or services), logic, profiles, and/or schemas used in embodiments described herein. In an embodiment, storage 225 and/or local storage 255 comprises a data store (or computer data memory). Further, although depicted as a single data store component, storage 225 may be embodied as one or more data stores and may include aspects of local storage 255. As shown in example system 200, storage 225 comprises a cloud-based data store, and local storage 255 comprises a data store on a client user device 250.

Storage 225 includes a set of one or more schemas 230. Embodiments of schemas 230 specify aspects of context data and in some instances may also specify a data structure and/or format of the context data. Thus, the context data (which may include user preferences) associated with a particular task, category of task, experience, or content, application 252, service 254, or client user device 250 or a type of application, service, or device, may be defined according to a schema. For example, where the task is reading email, an email schema may specify specific aspects of context data, such as an identification of the current email message that is being presented to the user, an offset indicating the position within the email message that the user has read to or viewed (or based on the portion of the message that has been presented), and an email account identifier or data source of the email message. In some embodiments, the schema may specify additional context data to store such as preferences or other parameters associated with the application, service, or computing experience. For example and without limitation, specific settings or preferences associated with the application or service (e.g., the font or text size for the email example), the time that the user engaged in the task (such as a date-time stamp or series of date-time stamps, which may also be used for determining how long ago the user engaged in that particular task which may indicate that the context could be out-of-date or stale, when sharing the context data onto a second device, application or service), an amount of time the user has viewed the message or engaged in the task, information about the device, application, and/or service that the user is using to view the message, etc.

Figure 3:
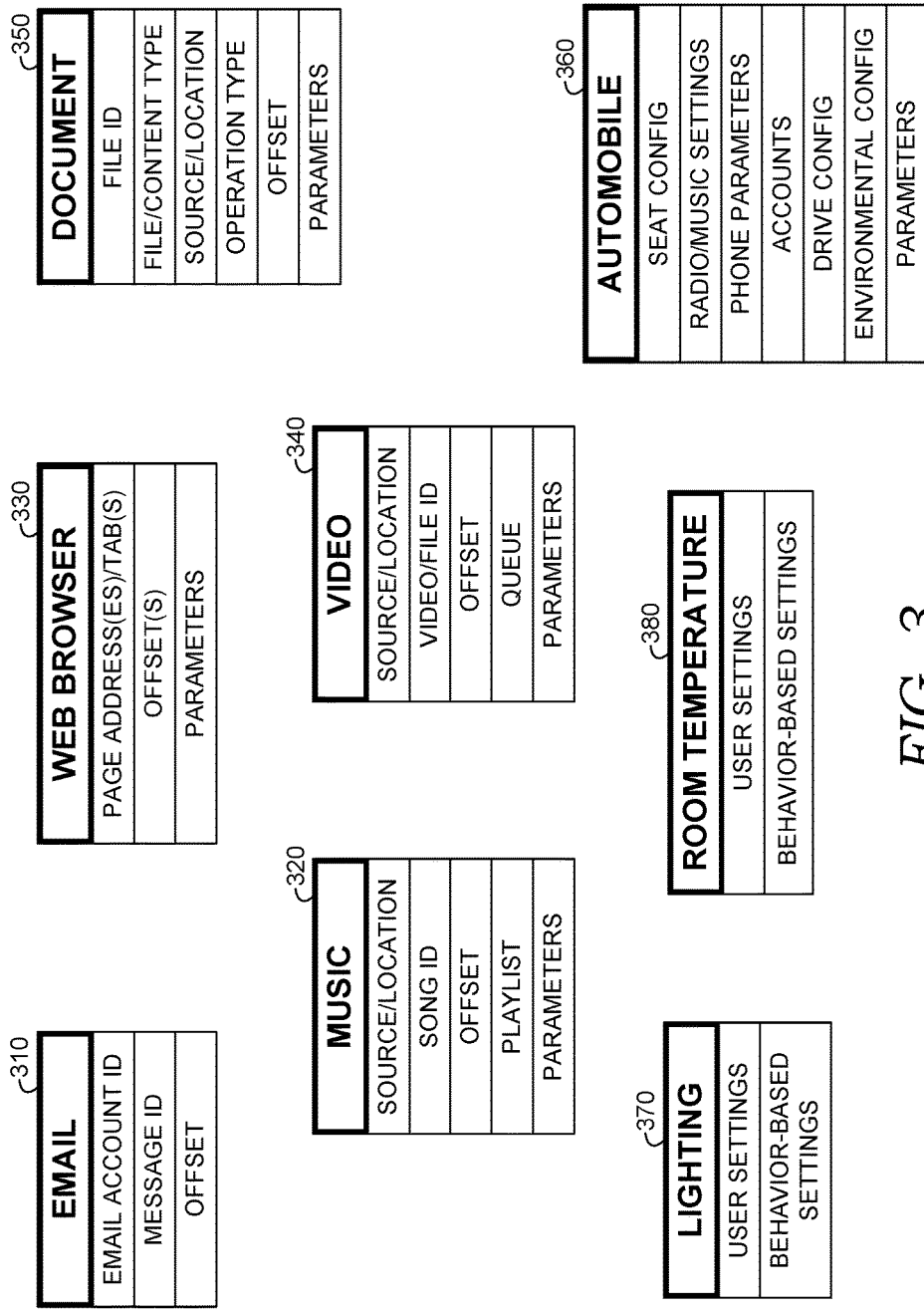
FIG. 3 illustratively depicts aspects of example schemas for preserving context data corresponding to a task or a computing experience, in accordance with an embodiment of the present disclosure.

Turning briefly to FIG. 3 with FIG. 2, aspects of a number of example schemas for preserving context data corresponding to a task or a computing experience are illustratively provided. In one embodiment, schemas 230 comprise a set of schemas including one or more of the example schemas of FIG. 3. These schemas include email schema 310, music schema 320, web browser schema 330, video schema 340, document schema 350, automobile schema 360, lighting schema 370, and room temperature schema 380.

Generally the aspects of context data identified by a schema are intended to enable context of a user session or user experience to be shared (or recreated) from a first user session to a second user session on another client user device 250, application 252, or service 254. Accordingly, each of the example schemas of FIG. 3 includes a number data fields identifying aspects of context data to be preserved in order to share (or recreate) the context in the second user session.

The specific data fields shown in FIG. 3 for each of the schemas is intended to be an illustrative example of aspects of context associated with a task or experience corresponding to the schema and are not intended to be limiting. Moreover, in many instances, the schemas will include an identification of the content, such as a file name or ID; a source of the content such as an address, file path, account, etc.; and an offset indicting the position or location in the content that the user is currently located or positioned when context data is preserved. In some embodiments or for some tasks or experiences schemas may also include other contextual information and/or parameters or settings, which may be set by a user, set to default values, or inferred based on user behavior.

Accordingly, example email schema 310 includes email account ID, which identifies an email account or source of the email viewed in the first user session, a message ID that identifies the particular email message being viewed in the first user session, and an offset indicating the position within the email message that the user has read to or viewed, which may be based on the portion of the message that has been presented. Music schema 220 includes source/location data specifying the source or location of music played in the first user session; song ID identifying the song being played (which may also include track, album, and/or artist information, file name, or a specific song ID); offset indicating the position in the song during the first user session where context is preserved (so that the song can be resumed from approximately the same position when the second user session begins); playlist, which includes information about songs previously played or songs to be played after the current song, and may specify a playlist file name and/or file location or may include the playlist information; and parameters, which may include playback parameters (e.g., equalizer settings, visualizations, speaker configurations, etc.) or user preferences associated with playing music in the first session.

Example web browser schema 330 includes a data field for page address(es)/tabs, which indicates the address(es) of webpages that the user is viewing or has loaded, and offset information indicating the offset position for the webpages; for instance, how far down the page the user has scrolled in the first user session when context data is preserved. Parameters may include other preferences or configurations, such the user's homepage, bookmarks, browsing history, security settings (e.g., block/deny lists, allow lists, parental settings, whether scripts are enabled), or commonly entered user information about the user (e.g., user address) to facilitate populating forms on webpages.

Example video schema 340 has data fields similar to email schema 310, but includes a queue rather than a playlist. In some embodiments, the queue may function similar to the playlist and indicate videos played previously or videos to be played after a current video.

Example document schema 350 includes data fields corresponding to aspects of context data corresponding to reading and authoring common document types. Example document schema 350 includes a file Id, identifying the file being read/written in the first user session; file/content type, specifying the document type or format (e.g., Word, PDF, JPEG, MIDI file/musical score, drawing format, etc.); source or location of the file, such as an file path, address, or other similar location; operation type, which may indicate the type of operation that the user is performing (e.g., reading vs. writing/authoring); offset, indicating the user's position or location within the document from the first user session; and other parameters, such as font size, color, or other settings, configurations, or user preferences.

Example automobile schema 360 includes user preferences or configurations associated with driving or riding in an automobile. Seat configuration includes data indicating the user's preferred seating position, which may be computer-controlled, and may further include data indicating position of rear-view mirrors, searing wheel and steering wheel column. Radio/music settings includes information specifying radio stations, music-related accounts (e.g., Sirius, XM radio, Pandora, Spotify, cloud-based music repositories, such as music stored on a user's Microsoft OneDrive storage or Amazon cloud player, etc.) as well as parameters or preferences associated with music playback, such as equalizer settings. Phone parameters may include information specifying the user's phone identification, Bluetooth or communication details to enable the user to automatically pair or otherwise use her phone upon sharing automobile context data, phone contacts, or other phone parameters. Accounts may include email accounts, social media accounts, or instant messaging accounts (e.g., WhatsApp®) that the user may desire to share with the vehicle to facilitate access, reading or composing of social media information as the user drives/rides. Drive configuration may include adjustable or configurable settings or preferences associated with driving the vehicle, such as vehicle responsiveness, handling, air or fuel settings, engine parameters, etc. Environmental configuration may include data specifying aspects of environment context such as temperature, which may include air conditioning/heating settings, seat warmer settings, etc., and lighting settings. Parameters may include other preferences or configurations, such as what metric is used to define the temperature or seat configuration (e.g., whether Metric or English standard of measurement).

Example lighting schema 370 and example room temperature schema 380 may include a data field for user settings, such as user-configurable preferences for lighting or temperature. Since specific physical lighting configurations may vary from one environment (user session) to another, in one embodiment, lighting may be controlled based on the available lights in each environment. Schema 370 and 380 also may include a data field indicating behavior-based settings. For example, where context monitor 256 determines that a user dims the lights each time she watches a movie, then dimming the lighting during playback of a video may be an inferred or learned lighting setting. Similarly, context monitor 256 may determine that the user has a pattern of adjusting the temperature down during the night. This observed behavior may be stored as a behavior-based setting of room temperature schema 380. Lighting schema 370 or room temperature schema 380 may be used, for example and without limitation, when a user travels to a hotel room away from home or works in a different office than her usual office.

The schemas of FIG. 3 are merely examples and are not intended to be limiting. Other examples of schemas corresponding to other tasks or aspects of a computing experience are contemplated. Additionally, in some embodiments, users or vendors, such as programmers or application developers, may modify existing schemas or define new schemas, which may be published to a repository (such as schemas 230 in storage 225) or otherwise made available to other users in order to facilitate the sharing of user context or preferences for new applications 252, services 254, client user devices 250, or for new aspects of existing applications, services, or devices. In some instances, a new or modified schema may be defined according to the API exposed by API layer 258. Defining a new schema or modifying an existing schema may also comprise updating the API to include new definitions, tools, or resources for handling context data corresponding to the new or modified schema. In some embodiments, a new schema may be inferred by context monitor 256 and/or analytics component 270, based on a plurality of observations of usage of an application 252 or service 254 (which may be new or never before observed) or a newly observed type of client user device 250. The plurality of observations of usage may come from single user or from multiple users (i.e., crowd sourced).

Returning to FIG. 2, storage 225 also includes one or more user profiles 240; an example embodiment of which is illustratively provided in FIG. 2. Example user profile 240 includes information associated with a particular user including, among other things, context data 242, user devices 243, access parameters 244, user accounts/user activity data 246, user settings 248, and analytics data 249. In one embodiment, user profile 240 may be associated with a Microsoft Account, Google Account (or Google Drive), Apple iCloud, or an online cloud-based storage account. Context data 242 is described above and may include user context information, user preferences, and other contextual information. The context data may correspond to a particular task or category of task, experience, or content, or a type of application, service, or device, and may be defined according to one or more schemas 230. In some embodiments, where context data 242 corresponds to a task or user experience that includes content or media, context data 242 may include information about the location or source of the content (e.g., an address or file path location) or may include a copy of the content or media (e.g., a video file or song file). In some embodiments, context data 242 may be stored securely with its access managed by access control manager 260.

User devices 242 includes information about client user devices 250 associated with or used by a user, as described previously. Access parameters 244 is described previously and generally includes rules, conditions, permissions, or other logic for managing access a user's information in the user profile, and in particular to context data 24, such as requesting, uploading, or sharing the context data 242.

User account(s) and activity data 246 generally includes user data collected from user-data collection component 210 (which in some cases may include crowd-sourced data that is relevant to the particular user), and may be used for accessing content corresponding to a task (e.g., a user's email account information and credentials enabling an email message to be accessed, identified, and loaded into a second user session), or may be used for determining context data about the user (e.g., user behavior patterns) or user session. User account(s) and activity data 246 may include data associated with user accounts, such as online accounts (e.g. email, social media), Microsoft® Net passport, user data relating to user accounts such as user emails, texts, instant messages, calls, and other communications; social network accounts and data, such as news feeds; online activity; and calendars, appointments, application data, or the like. Some embodiments of user account(s) and activity data 246 may store information across one or more databases, knowledge graphs, or data structures.

User settings 248 generally include user settings regarding user preferences other than access parameters associated with a context sharing system and services. For example, a user may specify a frequency at which context is preserved during a first user session. As another example, a user may specify whether to preserve context based on properties of communications networks (e.g., a user may elect not to share context when the user is roaming and the user may incur expensive data charges).

Analytics data 249 generally includes information determined by analytics component 270, and may include personalized content for presentation to the user, such as recommendations or suggestions, as described below.

Analytics component 270 is generally responsible for analyzing aspects of the context data and usage from one or more users. Analytics component 270 may be embodied as a cloud-based component or distributed across one or more client user devices 250 and the cloud (or server side). In some embodiments, analytics component 270 accesses context data (from storage 225 and/or from context monitor 256) and analyzes it to determine useful analytics information. For example, based on this analysis, analytics component 270 may determine inferences about the user and her usage patterns. These inferences may be used to provide a personalized computing experience to a user; for instance, by recommending applications, services, or content. The analytics data, which may include the recommendations, suggestions, or other related information derived from the analysis, may be stored in analytics data 249 of user profile 240, in storage 225.

In some embodiments, analytics component 270 analyzes context data across multiple users, while maintaining user privacy, and provides inferences based on an entire user population or subsets of similar users (e.g., users that have characteristics in common with other users, such as users located the same region; users that use the same application 252, service 254, or type of user device 250; user that have similar user preferences, carry out similar tasks, or view or listen to similar content). In some embodiments this analytics information may be shared (while preserving user privacy) with developers or vendors, for example, in order to develop new or improved schemas. In some instances, the inferences may be used to improve system performance of the context sharing system (such as by making changes to the API exposed by API layer 258), reduce costs of service, and/or derive and introduce new features and capabilities. For example, in one embodiment, analytics component 270 may identify new tasks, based on usage patterns and user behaviors, for which it may benefit users by adding a new schema for the newly identified task.

Similarly, analytics component 270 may learn form factors of client user devices (including new devices) and location analytics. In this way, the suggestions or recommendations, provided by some embodiments of analytics component 270, may be personalized to users, according to the users' circumstances. For example, where the user is watching a movie on her phone and then transitions to watching the movie on her desktop, analytics component 270 may determine and recommend a better video player for the user on the desktop. In some embodiments, the inferences determined by analytics component 270 may be used to establish default settings and parameters, such as access parameters 244.

Figure 4:
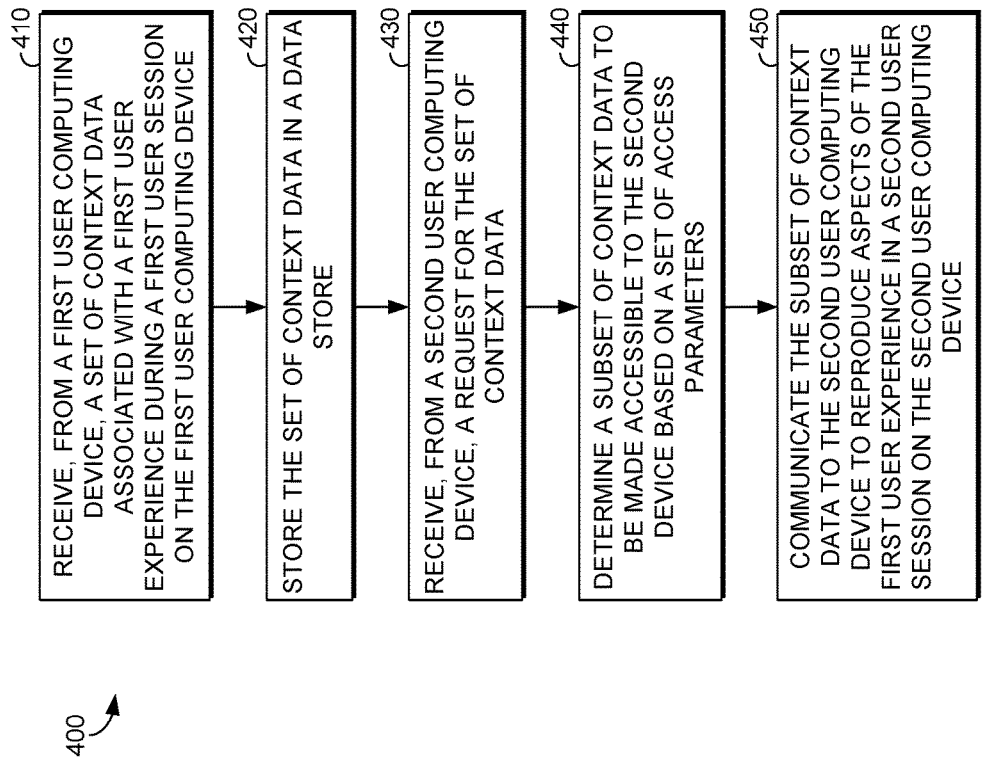
FIGS. 4-6 depict a flow diagrams of a methods for sharing user context or preferences across application, services, or devices, in accordance with embodiments of the present disclosure.

Turning to FIG. 4, a flow diagram is provided illustrating one example method 400 for sharing user context or preferences across application, services, or devices. In one embodiment, method 400 may be performed by access control manager 260 and/or by a server associated with access control manager 260 and/or storage 225. In one embodiment, method 400 may be carried out as a cloud-based process or a distributed computing process, using one or more servers or other computing devices. Each block or step of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 410, receive, from a first user computing device, a set of context data associated with a first user. Embodiments of step 410 may receive context data from a first user computing device, such as a client user device 250. In one embodiment, the context data is received by access controller 260, or by a server associated with access controller 256 and a data store for storing the context data, such as storage 225 (or local storage 255, in some embodiments.) The context data may be received from an application or service running on the client user device 250 and/or may be communicated by an API layer such as API layer 258. In one embodiment the context data is received using REST over HTTP(s) or other protocols described in connection to API layer 258.

The context data may represent contextual information, such as user context or preferences of a first user session on the first user computing device, which in some instances may involve performing a task by an application 252 or service 254 on the first user computing device. As further described herein, in some embodiments, the context data may be determined by a context monitor 256 associated with the first user computing device, and may be based on a schema corresponding to the task performed by application 252 or service 254.

In some embodiments, method 400 includes performing authentication and/or authorization in step 410 or prior to step 420. For instance, as further described herein, access control manager 260 may authenticate a user device, application, or service (or a user associated with a device, application, or service) and using a set of access parameters 244, determine a level of authority, for instance, whether storing (e.g., writing) authority is permitted. Thus for example, a user who enables context sharing across her tablet and a hotel television may want to control not only what the hotel television can read (i.e. what context it receives) but may also or alternatively want to control what the hotel television can write to her context. By controlling the writing (or storing) of her context, the user may be provided a degree of privacy (i.e., she is watching or consuming the content incognito). Additionally, the user may prevent user devices that are shared with other users (such as the hotel television) and which as a result may be more likely to be infected with malware, from overwriting her context with malicious content or otherwise damaging the information in her data store.

At step 420, store the set of context data in a data store. Embodiments of step 420 store the received context data in a data store, such as storage 225. The context data may be stored in a data store associated with a user of the first user computing device, such as in context data 242 or user profile 240 on storage 225. In some embodiments, identifying information is received with the context data. In some instances, information identifying the user of the first user computing device, identifying an account associated with the user (or with user profile 240) or identifying the first user computing device (i.e., a user device 250) or an application 252 or service 254 on the first user computing device that is associated with creating the context data, may be received prior to receiving the context data. For instance a request for accessing the context data 242 in user profile 240 in order to write to it (or have the server/access control manager 260 write to it) with newly determined context data) may be received prior to, with, or following the received context data. In some embodiments, the context data may be received and/or stored as a data structure determined based on a schema, as described herein.

At step 430, receive, from a second user computing device, a request for the set of context data. Embodiments of step 430 receive a request for the set of context data received in step 410. In some embodiments the request may be received using REST over HTTP(s) or other protocols described in connection to API layer 258. The request may be received from a second user computing device, such as a second client user device 250. In some instances, the first user computing device is a different type of computing device than the second user computing device. For example, the first user computing device may be a smartphone and the second user computing device maybe a laptop or home entertainment system. Similarly, in some instances, the first user computing device may be configured differently than the second user computing device. for example, the two user computing devices may each run a different operating system 251, or have different applications 252 or services 254 installed and/or running In some instances, an application 252 or service 254 on the first user computing device that is associated with the context data received in step 410 is different than the application 252 or service 254 on the second user computing device that requests the context data in step 430. It is contemplated that both of the applications 252 or services 254 may be associated with the same performing the same or similar tasks (e.g., playing music or browsing the Internet) or similar user preferences. For example, the different applications 252 or services 254 may be developed by different vendors or developers or programmed using different computer programming languages, such as a native iOS browser on the first user computing device and Microsoft Edge Browser on the second user computing device.

In some embodiments of step 430 or method 400 further include performing authentication on the request for context data. In particular, an access control manager 260 may authenticate the request (or more specifically perform authentication on the second user computing device, an application or service on the second user computing device, a user associated with the second user computing device). Thus in some embodiments, identifying information, such as described in step 410, may be provided in conjunction with (or prior or subsequent to) the request received in step 430. Further, in some embodiments credentials information also may be received from the second user computing device. In such embodiments, the credentials information may be used for performing the authentication or otherwise validating identify of the second user computing device or a user associated with the second user computing device. The credentials may be provided with the request, with the identifying information, or may be provided in response to a request for the credentials (such as a security challenge) issued by the server or access control manager 260 that receives the request for context data in step 430.

At step 440, determine a subset of context data to be made accessible to the second device based on a set of access parameters. Embodiments of step 440 determine a subset of the requested context data to make accessible to the second user computing device. Put another way, embodiments of step 440 determine authorization (e.g., an access level or permission level) for accessing the context data by the second user computing device. The subset of context data may be determined by an access control manager 260 using a set of access parameters. For instance, a set of access parameters 244 in a user profile 240 associated with a user of the first user computing device may be utilized by access control manager 260 to determine a level of access or permission to be imparted to the second user computing device for accessing the context data or to determine how much of the context data to provide to the second user computing device in response to the request (step 430).

As described herein, set of access parameters 244 may be used by access control manager 260 to determine the amount of context data to be provided (or made accessible) to the second user computing device. For example, access parameters 244 might set limits on the specific quantity of context data shared, based on the second user computing device or properties associated with the second user computing device (such as its location; the type of client user device 250 that it is (such as a mobile device, laptop, iPhone); or other properties (such as whether the device is registered with or recognized by access control manager 260, whether it is a rental device or borrowed device (e.g., where the device is identified as a rental car or hotel television or identified as belonging to another user), etc.) Accordingly, the term subset is used broadly to refer to a limit, condition, or level of permission applied to the context data. In some instances, a subset of the set of context data (i.e., a subset of context data) may comprise none of the context data (i.e., the subset is size zero). In other words, in such instances, the second user computing device receives none of the set of context data. In other instances, the subset of the set of context data may comprise all of the context data. (In other words, the second user computing device receives full access to the set of context data.) Still in other instances, a subset of the set of context data comprises less than full access rights or permissions to the context data, for example, a portion (or less than all) of the set of context data. Regardless of the specific level of access that a subset indicates, embodiments of step 440 determine the subset according to a set of access parameters. Additional details regarding access parameters are described in connection to access control manager 260 and access parameters 244 of system 200 in FIG. 2.

At step 450, communicate the subset of context data to the second user computing device to reproduce aspects of the first user experience in a second user session on the second user computing device. Embodiments of step 450 communicate the subset of context data determined in step 440 to the second user computing device. The subset context data maybe communicated in response to or following the request for context data received in step 430. In some embodiments an access control manager 260 or a server associated with the context data 242 in storage 225 communicates the subset of context data. The subset of context data may be received by an application or service operating on the second user computing device, such as an API layer 258, in an embodiment. Once received at the second user computing device, the context data may be applied to or utilized by the second user computing device or to an application 252 or service 254 on the second user computing device to reproduce aspects of the first user experience form the first user computing device. In this way, user context or preferences from a user experience associated with the first user computing device are shared across applications, services, or computing devices.

Figure 5:
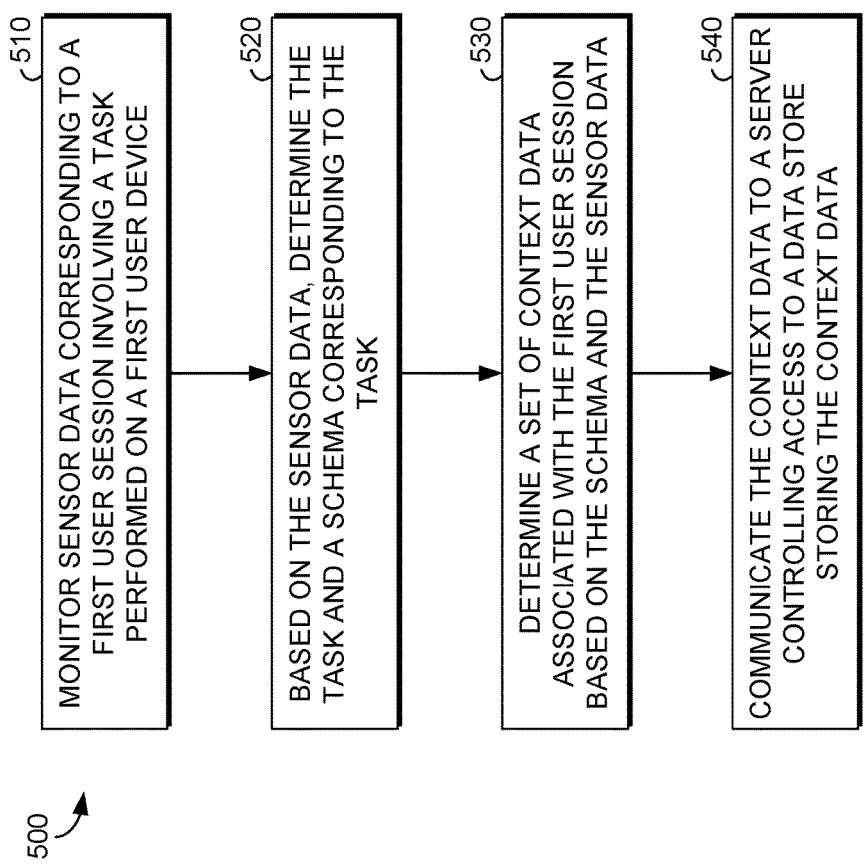

With reference now to FIG. 5, a flow diagram is provided illustrating one example method 500 for storing the context of the user experience, from a first user session on a first user device, in a manner to facilitate replication of the context on a second user device configured differently than the first user device. In some embodiments, method 500 may be carried out on a computing device such as client user device 250 described in FIG. 2. At a high level, method 500 includes determining contextual information associated with a user experience in a first user session on a first user device and formatting or organizing the contextual information into a set of context data according to a common schema. The context data may be communicated to a data store, such as a cloud-based data store, where it may be stored in a user account associated with a user of the first user device. The common schema facilitates the interpretation and utilization of the context data by other application or services on other client devices by storing the contextual information in a format and/or structure such that it is standardized or universalized in the sense that the other application or services can read, interpret, and/or utilize it. In particular, with knowledge of the schema, which may be provided with the schema in a repository accessible by the developers, the developers of the other applications or services enable the applications or services to read, write, understand, or apply the schema.

Accordingly, at step 510, monitor sensor data corresponding to a first user session involving a task performed on a first user device. Embodiments of step 510 monitor a first user session involving a task performed on the first user device. As described herein, the task may be carried out by an application 252 or service 254 for a user; for instance, reading email, playing music, controlling a vehicle, etc. In some embodiments, one or more sensors on the first user device, such as sensor 103a, or associated with the first user device or applications 252 or services 254 running on the first user device, such as sensor 107, or more generally, user-data collection component 210, may provide sensor data including user data to a context monitor 256. The sensor data (including user data) may correspond to the first user session involving a task performed on the first user device. Accordingly, in some embodiments, a context monitor 256 monitors the sensor data (including user data).

At step 520, based on the sensor data, determine the task and a schema corresponding to the task. Embodiments of step 520 determine a task involved in the first user session and determine a schema corresponding to the task. In some embodiments, the task may be determined by a context monitor, such as context monitor 256, which may be a standalone application or service operating on the first user device (or distributed across the first user device and in the cloud), may be part of an operating system 251 on the first user device, or may be incorporated into an application 252 or service 254 that is performing the task, such as an email app. In some embodiments, the task may be determined based on an application or service (such as application 252 or service 254) being used in the first user session. For instance, music playing app, a video editor, an email app, etc.

Where multiple applications or services are running, during a user session, the task associated with the most recent user-interactions sensed by the sensors (or otherwise detected from the user data) may be identified and context data corresponding to this task may be preserved in method 500, in some embodiments. In other embodiments, context data associated with all tasks identified from running applications or services (or with multiple tasks that may be detected from user interactions in the current user session) may be identified, and their corresponding context data preserved. (In these embodiments, where a user resumes working on another computing device (or other application or service that handles a same task) only context associated with tasks identified from the other computing device (or other application or service) may be retrieved and replicated. For instance, if on a first device, such as the user's mobile phone, the user is listening to music while reading email, and then the user puts down the phone to use her laptop. If the user only opens an email application on the laptop, then only the email context may be replicated. Alternatively, the entire context may be replicated (including the music) upon the user beginning to use her laptop. In some embodiments, a user may configure settings for this type of scenario in her user settings 248 of user profile 240.

Accordingly in the following example of one or more embodiments of the methods or systems described herein, context data may be shared corresponding to multiple tasks, preferences, or settings. Suppose a user goes to a hotel room. The user may share a context onto a plurality of client user devices in the hotel room, based on recent user sessions conducted on her own user device(s) (or applications 252 or services 254) for handling similar tasks. For instance, the user may provide identifying information (which may include credentials for authentication, in some embodiments) to the hotel room or the hotel, whereupon context may be shared to the plurality of client user devices (e.g., client user devices 250) in the hotel room. For example, the lighting and thermostat may receive a context data that includes conditions for controlling lighting and temperature according to the user's preferences or behavior (such as described in FIG. 3); the hotel room television may receive access to a video queue that was recently being watched by the user, the shower may receive context data about a preferred temperature; the radio/alarm clock may receive context data about the user's alarm settings (e.g., wake-up times, snooze settings, wake-up music playlist, etc., which may also be based on the user's personal calendar.) For example, meetings scheduled in the user's calendar may be considered settings or user preferences that comprise contextual information. Thus, context data representing this may be provided to a hotel alarm clock so that the user is awakened in time for a meeting.

In some embodiments, as described herein, access by the hotel room (or hotel, or specific client user devices in the hotel room) to the user's context data may be temporary, based on access parameters. As described above, in some embodiments, a user may provide identifying information, which may include credentials for authentication, to the hotel room or the hotel to enable the context sharing. In particular, various embodiments, the identifying information may be provided so that context may be shared. By way of example and without limitation, the identifying information may be provided by the user, such as via a computer terminal or user interface in the hotel room (e.g., via a UI service on the user's television similar to user-controlled services commonly found on hotel televisions enabling users to receive invoices), may be entered by a hotel receptionist upon the user's checking into the hotel, may be communicated via a Bluetooth or similar connection by the user's smartphone upon entering the room, or may be communicated in advance, such as at the time the user books the room online. For instance, in one embodiment, a virtual assistant for the user, such as Microsoft Cortana may communicate the user's identifying information with a bot associated with the hotel at or near the time of booking, or prior to or at the time of the user's arrival to the hotel room. (A bot is a semiautonomous program or service typically powered by rules or artificial intelligence that facilitates carrying out a task, such as reserving a hotel room. One commonly occurring type of bot is a chatbot.) Another example similar to this hotel room example, may transpire when a user rents a car.

Continuing with step 520, a schema corresponding to the task may be determined based on an application or service (such as application 252 or service 254) being used in the first user session (or multiple applications, services, as described in the preceding paragraph), or based on the determined task (or tasks, as described in the preceding paragraph). In some embodiments, a schema may be associated with a particular application 252 or service 254 for handling certain tasks. For instance, a schema may identify a set of applications 252, services, 254, or tasks that it applies to or may be used with, or an application 252 or service 254 may identify a particular schema to use for preserving or replicating context, or a user may specify a schema to use. In some embodiments, context monitor 256 may determine an appropriate schema based on an analysis of contextual information and user settings associated with the current user session and the available schemas, and select the most appropriate schema(s) to use.

At step 530, determine a set of context data associated with the first user session based on the schema and the sensor data. Embodiments of step 530 determine a set of context data using the schema determined in step 520 and the sensor data (including user data). In some embodiments, the schema determined in step 520 specifies a data structure for representing the context of the first user session. For example, as described in connection to schema 230 of FIG. 2 or FIG. 3, a schema may include a set of data elements characterizing aspects of the first user session. Accordingly, some embodiments of step 530 determine values for the data elements corresponding to the current user session involving the task determined in step 520. Some embodiments of step 530 are performed using context monitor 256. For example, for the task of reading email (e.g., providing email content for the user), context monitor 256 (or operating system 251, or the email application 252 or service 254, or another service) may determine data elements that represent a context associated with the task of reading email. For example, using the example email schema structure 310 of FIG. 3, this might include an email account ID identifying the source of the email content, a message ID identifying the specific email message, and an offset. Similarly, where the task includes providing other content such as music or video, another schema structure may be used, such as music schema 320 or video schema 340, respectively.

At step 540, communicate the context data to a server controlling access to a data store storing the context data. Embodiments of step 540 communicate the context data determined in step 530 to a data store associated with a user of the first user device, where it can be stored and potentially made available (according to access parameters) to another user device, application, or service. In some embodiments, the server controlling access to the data store is embodied as an access control manger 260, described in system 200. In some embodiments, an API layer operating on the first client device may facilitate communicating the context data to the server. For example, as described in connection to API layer 258 in FIG. 2, a common communication protocol, such as REST over HTTP or HTTPS may be used, which further facilitates the interoperability of embodiments of this disclosure. In some embodiments, before the context data communicated to the server is written to the data store, the first user device (or a user associated with the first user device, or the application 252 or service 254 associated with the task determined in step 520) may be authenticated. The authentication may be performed according to any of the examples described herein.

Figure 6:
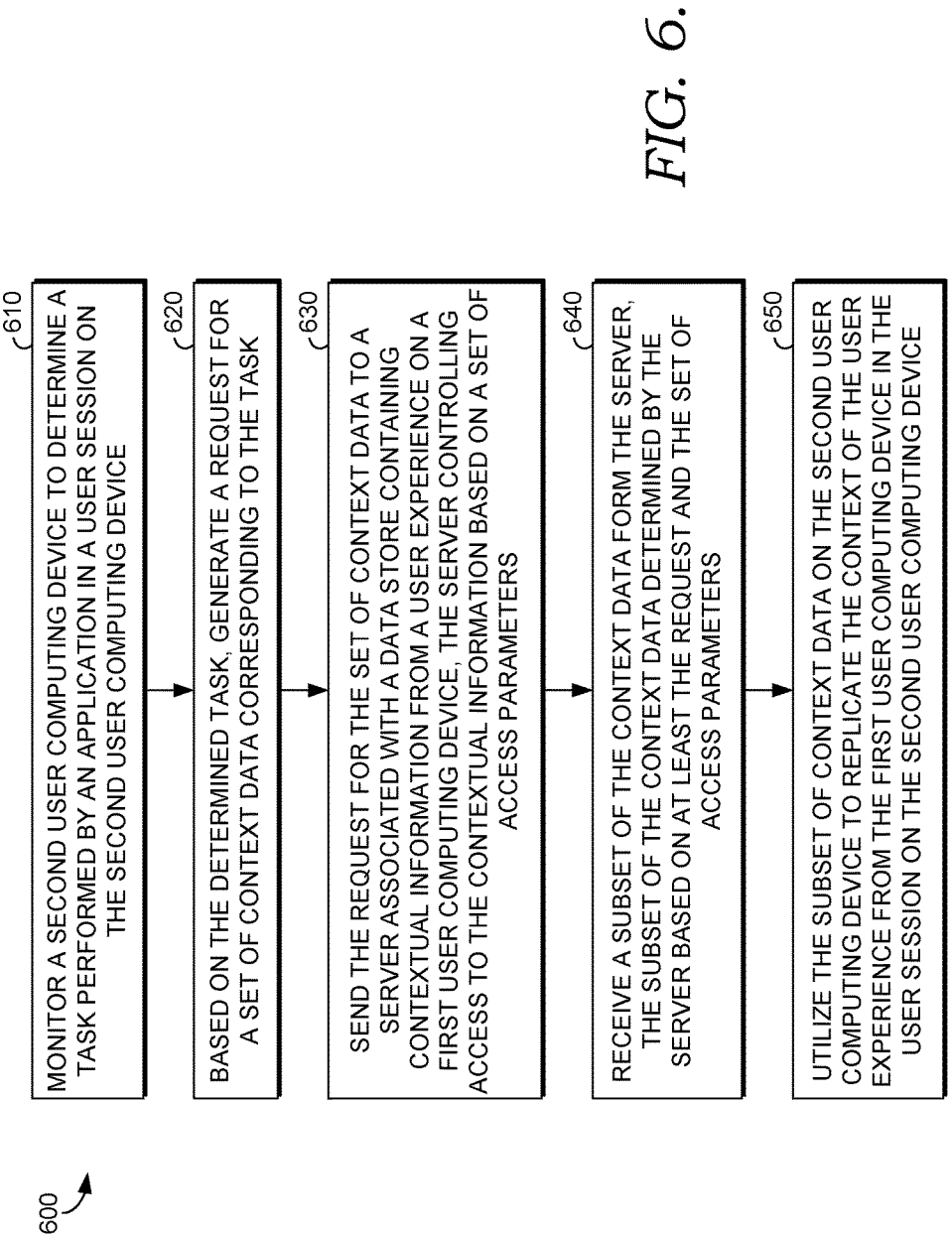

Turning now to FIG. 6, a flow diagram is provided illustrating one example method 600 for replicating a context of a user experience, from a first user computing device, on a second user computing device configured differently than the first user computing device. In some embodiments, method 600 may be carried out on a computing device such as client user device 250 described in FIG. 2. At a high level, method 600 includes determining a task being carried out on a computing device (referred to in method 600 as the "second" user computing device), which may have been recently initiated by the user of the computing device, and checking to see if there exists context data associated with the task from a previous user session conducted by the user. If so, then the set of context data may be received from a data store associated with the user and applied to the computing device (or application or service running on the computing device) to replicate the user experience from the previous user session, which may be been carried out on a different computing device or different application or service than being used currently by the user. In some embodiments, the set of context data received may comprise a subset of context data, which may be determined based on access parameters and information about the computing device requesting the context data (or a user associated with the computing device). In some embodiments, the subset of context data may comprise and be determined according to embodiments described in connection to access control manager 260 or step 440 or method 400.

Accordingly, at step 610, monitor a second user computing device to determine a task performed by an application in a user session on the second user computing device. Embodiments of method 600 determine a task performed by an application 252 or service 254 on the second user device. In some embodiments, the task may be determined in a manner similar to how the task is determined in step 520 of method 500. For instance, in some embodiments, a context monitor 256 (or other service associated with the operating system of the second computing device, or the application 252 or service 254 performing the task) may determine the task in step 610. In some embodiments, method 600 is carried out upon a user first using the second user device or launching an application or service for the task determined in step 610.

At step 620, based on the determined task, generate a request for a set of context data corresponding to the task. Embodiments of step 620 generate a request for a set of context data corresponding to the task determined in step 610. For example, where the task is reading email (e.g., the user has just launched an email program), then a request is generated for context data corresponding to reading email, which may be defined according to an email schema (such as email schema 310 of FIG. 3) as further described herein. (It should be noted that in some embodiments, upon the user using a second user computing device, a context may be determined from the most recent user session conducted by the user on another user computing device (or a recent user session)—regardless of the task that the user may be performing on the second user computing device. In some instances, a user may configure preferences for such scenarios via user settings 248.)

Some embodiments of step 620 may be performed by a context monitor 256 operating on the second user computing device, by an application 252 or service 254 associated with the task, by a service associated the operating system of the second user computing device, or by another application or service. In some embodiments, a request for context data is generated using an API by an API layer or is received by an API layer on the second user computing device. In some embodiments, the generated request includes identifying information identifying the task determined in step 610, and/or information identifying the second user computing device or user of the second user computing device. For instance, in one embodiment, the generated request includes information identifying a data-store account associated with the user (which thus identifies the user) for retrieving context data stored from a previous user session.

At step 630, send the request for the set of context data to a server associated with a data store containing contextual information from a user experience on a first user computing device, the server controlling access to the contextual information based on a set of access parameters. Embodiments of step 630 communicate the request for the set of context data to a server associated with a data store containing contextual information. In one embodiment, the server comprises an access control manager 260, such as described in FIG. 2. The request may be communicated using an API layer 258 (also described in FIG. 2), which may utilize common communication protocols, such as REST over HTTP(S) or other protocols described herein.

In some embodiments, the request for the set of context data and the identifying information in the request may be communicated separately (i.e., not in the same communication). For example, in one embodiment a request for the context data may be communicated, and in response to the request, the server may request credentials or other identifying information associated with the second user computing device in order to perform authentication and determine a level of access to the context data (based on access parameters, such as described in step 640).

At step 640, receive a subset of the context data form the server, the subset of the context data determined by the server based on at least the request and the set of access parameters. Embodiments of step 640 receive, from the server associated with a data store containing contextual information, a subset of the requested context data. The subset may be received by an API layer 258 on the second user computing device or by another application or service on the device. The subset may be determined by the server based on the request for context data and a set of access parameters specifying access permissions to the context data stored in the data store. Some embodiments of step 640 may determine a subset of the context data in a manner similar to the embodiments described in connection to access control manager 260 of system 200 (FIG. 2) or step 440 of method 400 (FIG. 4). For instance, a set of access parameters may specify that a the type of computing device that is the second user computing device, should only receive certain aspects of the context data but not all of the context data. In some embodiments, all of the context data or none of the context data may be received in the subset, based on the access parameters and identifying information.

At step 650, utilize the subset of context data on the second user computing device to replicate the context of the user experience from the first user computing device in the user session on the second user computing device. Embodiments of step 650 incorporate the information provided in the subset of context data to reproduce the context from a first user computing experiencer associated with the context data. For example, where the user is listening to music on the second user computing device, the same song and same song position from a previous user session may be loaded onto the second user computing device to that the user may continue the user experience onto the second user computing device. (Thus the context has been shared across devices.)

Some embodiments of step 650 may be carried out by an application 252 or service 254 on the second user computing device, by a context monitor 256 on the second user computing device, by a service of the operating system 251, or by another application or service on the device. In one embodiment, the subset of context data comprises a number of data fields having values for various aspects of context associated with a task or other user preferences on the device. In this embodiment, the information from the subset of context data is then utilized by setting the value of aspects of the current user session on the second user computing device to the values indicated in the data fields. For example, where the user is reading email, a current email to be presented (corresponding to an email that the user was in the middle of reading in a previous session conducted on the first user computing device) to the user may be identified based on a message ID data field, and an offset of the email also identified, so that user is presented the same email at the same place on the second user computing device as where the user was reading on the first user computing device. In this way, context is shared across devices.

Accordingly, we have described various aspects of technology directed to systems and methods for improving interoperability by enabling the sharing of user context or preferences for a computing experience across computing devices, operating systems, applications, or locations. It is understood that various features, sub-combinations, and modifications of the embodiments described herein are of utility and may be employed in other embodiments without reference to other features or sub-combinations. Moreover, the order and sequences of steps shown in the example methods 400, 500, and 600 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 7:
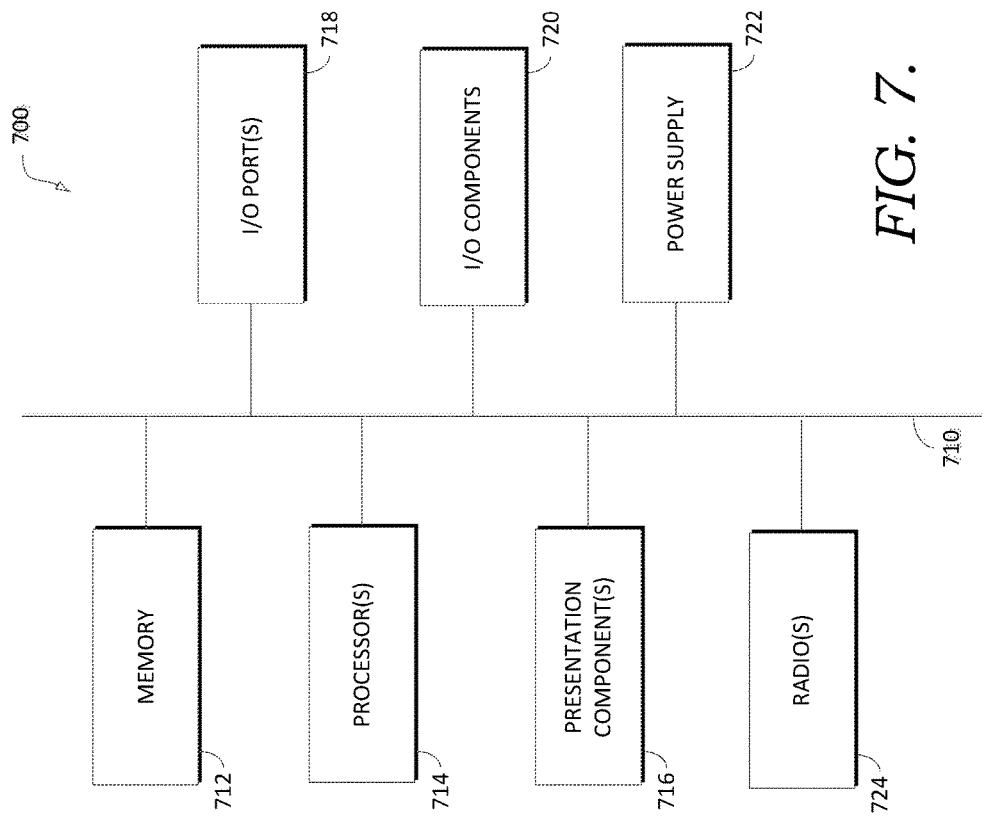
FIG. 7 is a block diagram of an exemplary computing environment suitable for use in implementing an embodiment of the present disclosure.

Having described various implementations, an exemplary computing environment suitable for implementing embodiments of the disclosure is now described. With reference to FIG. 7, an exemplary computing device is provided and referred to generally as computing device 700. The computing device 700 is but one example of a suitable computing environment and is not intended to suggest any limitation as to the scope of use or functionality of embodiments of the disclosure. Neither should the computing device 700 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc.

Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Embodiment 1

A system comprising: a data store configured for storing context data, the context data comprising information characterizing aspects of a user context of a task performed on a computing device or user preferences associated with an application, service, or the computing device; an access control manager configured to control access to data stored on the data store according to a set of access parameters; one or more processors; and computer storage memory having computer-executable instructions stored thereon which, when executed by the processor, implement a method for sharing user context or preferences across applications, services, or computing devices, the method comprising: receiving, from a first user computing device, a set of context data associated with a first user experience during a first user session on the first user computing device; storing the set of context data in the data store, the set of context data stored as a data structure determined at least in part according to a schema; receiving, from a second user computing device, a request for the set of context data; determining, using the access control manager, a subset of context data to be made accessible to the second device, the subset of context data determined based at least in part on the set of access parameters; and communicating the subset of context data to the second user computing device to reproduce aspects of the first user experience in a second user session on the second user computing device.

Embodiment 2

The system of embodiment 1, further comprising: performing, by the access control manager, authentication of the request for the set of context data using the access parameters, in response to receiving the request for the set of context data from the second user computing device, and wherein the subset of context data is further determined based on the authentication.

Embodiment 3

The system of any of embodiments 1-2, wherein performing authentication comprises authenticating the second user computing device, or authenticating an application, service, or user associated with the second user computing device, wherein the application, service, or user associated with the second user computing device are determined by the access control manager based on the request for the set of context data.

Embodiment 4

The system of any of embodiments 1-3, wherein the request for the set of context data is received as a REST over HTTP(S).

Embodiment 5

The system of any of embodiments 1-4, wherein (a) the first user computing device has a first operating system and the second user computing device has a second operating system that is different than the first operating system; or (b) the first user session involves performing a task on the first user computing device by a first application, and the second user session on the second user computing device involves performing the task using a second application that is different than the first application, wherein the context data is applied to the second application to reproduce the aspects of the first user experience in the second user session.

Embodiment 6

The system of any of embodiments 1-5, further comprising a user interface associated with the access control manager and comprising a control panel configured to enable a user configure the set of access parameters, and wherein the set of access parameters are configured by a user associated with the first user computing device, using the user interface.

Embodiment 7

The system of any of embodiments 1-6, wherein the access parameters comprise rules, conditions, permissions, or other logic for accessing the context data on the data store, and wherein the context data is stored on the data store in a user account associated with a user of the first user computing device.

Embodiment 8

The system of any of embodiments 1-7, wherein the access parameters includes conditions specifying access to the context data based on one or more of: a geographical location of the user computing device requesting access to the context data; a duration of time for which access to the context data is permitted; a historical record of previous requests for context data from the computing device requesting access to the context data; a registration record of the computing device requesting access to the context data; the type of computing device requesting access to the context data; and a category of the task performed on the computing device requesting access to the context data or a category or the application or service for carrying out the task.

Embodiment 9

The system of any of embodiments 1-8, wherein the schema specifies a data structure for representing the context data comprising a set of data elements characterizing aspects of the task or the first user experience.

Embodiment 10

The system of any of embodiments 1-9, further comprising: an analytics component configured to analyze the set of context data and other context data associated with users of other computing devices; and based on an analysis of the context data and other context data associated with the other users: (a) determining a recommendation of an application for carrying out a first task associated with the first user session, and communicating the recommendation with the subset of context data to the second user computing device; or (b) determining or modifying the schema.

Embodiment 11

A system comprising: one or more sensors configured to provide sensor data; a context monitor configured to monitor a context of a user experience on a computing device; an API layer configured to facilitate, using an API, communication of context data with a server controlling access to a data store; one or more processors; and computer storage memory having computer-executable instructions stored thereon which, when executed by the processor, implement a method for storing the context of the user experience, from a first user session on a first user device, in a manner to facilitate replication of the context on a second user device configured differently than the first user device, the method comprising: monitoring, by the context monitor, sensor data corresponding to the first user session involving a task performed on the first user device; based on the sensor data, determining the task and a schema corresponding to the task, the schema specifying a data structure for representing the context of the first user session and comprising a set of data elements characterizing aspects of first user session; determining a set of context data associated with the first user session based on the schema and the sensor data; and communicating, using the API layer, the context data to the server controlling access to the data store for storage of the context data on the data store in a user account associated with a user of the first user device.

Embodiment 12

The system of embodiment 11, wherein the API layer communicates the context data to the server using REST over HTTP(S).

Embodiment 13

The system of any of embodiments 11-12, wherein the context data comprises the data structure determined according to the schema and wherein context data includes contextual information related to the task or user settings associated with the task or the first user device.

Embodiment 14

The system of any of embodiments 11-13, wherein the task includes providing content for the user of the first user device, and wherein the aspects of the first user session characterized by the set of data elements of the schema include: a source of the content, an offset value indicating a position within the content that has been provided to the user; and a set of parameters comprising a user configuration associated with the task.

Embodiment 15

The system of any of embodiments 11-14, wherein the context data is determined upon: (a) detecting, using the sensor data, that the user is no longer using the first user device; or (b) receiving an indication from the server that the user is using the second user device.

Embodiment 16

A computer-performed method for replicating a context of a user experience, from a first user computing device, on a second user computing device configured differently than the first user computing device, the method comprising: monitoring the second user computing device to determine a task performed by an application in a user session on the second user computing device; based on the determined task, generating a request for a set of context data corresponding to the task, the request including information identifying the task and information identifying the second user computing device or a user associated with the second user computing device; sending the request for the set of context data to a server associated with a data store containing contextual information from the user experience from first user computing device, the server controlling access to the contextual information based on a set of access parameters; receiving a subset of the context data form the server, the subset of the context data determined by the server based on at least the request and the set of access parameters; and utilizing the subset of context data on the second user computing device to replicate the context of the user experience from the first user computing device in the user session on the second user computing device.

Embodiment 17

The method of embodiment 16, wherein monitoring the second user computing device to determine a task performed by an application comprises monitoring sensor data provided by one or more sensors associated with the second user computing device.

Embodiment 18

The method of any of embodiments 16-17, further comprising: receiving an authentication challenge from the server in response to sending the request; and providing credentials to the server in response to the authentication challenge, wherein the subset of the context data is further determined based on the credentials.

Embodiment 19

The method of any of embodiments 16-18, wherein the received subset of context data comprises a data structure defined according to a schema corresponding to the task, the data structure and including data elements characterizing aspects of the context of the user experience from the first user computing device.

Embodiment 20

The method of any of embodiments 16-19, wherein the request is generated based on an API associated with the server and wherein the request is sent to the server using REST over HTTP(s).

What is claimed is:
1. A system comprising:
a data store configured for storing context data, the context data comprising information characterizing aspects of a user context of a task performed on a computing device or user preferences associated with an application, service, or the computing device;
an access control manager configured to control access to data stored on the data store according to a set of access parameters;
one or more processors; and
computer storage memory having computer-executable instructions stored thereon which, when executed by the processor, implement a method for sharing user context or preferences across applications, services, or computing devices, the method comprising:

receiving, from a first user computing device, a set of context data associated with a first user experience during a first user session on the first user computing device;

storing the set of context data in the data store, the set of context data stored as a data structure determined at least in part according to a schema;

receiving, from a second user computing device, a request for the set of context data;

determining, using the access control manager, a subset of context data to be made accessible to the second device, the subset of context data determined based at least in part on the set of access parameters; and communicating the subset of context data to the second user computing device to reproduce aspects of the first user experience in a second user session on the second user computing device.

2. The system of claim 1, further comprising:
performing, by the access control manager, authentication of the request for the set of context data using the access parameters, in response to receiving the request for the set of context data from the second user computing device, and
wherein the subset of context data is further determined based on the authentication.

3. The system of claim 2, wherein performing authentication comprises authenticating the second user computing device, or authenticating an application, service, or user associated with the second user computing device, wherein the application, service, or user associated with the second user computing device are determined by the access control manager based on the request for the set of context data.

4. The system of claim 1, wherein the request for the set of context data is received as a REST over HTTP(S).

5. The system of claim 1, wherein:
(a) the first user computing device has a first operating system and the second user computing device has a second operating system that is different than the first operating system; or
(b) the first user session involves performing a task on the first user computing device by a first application, and the second user session on the second user computing device involves performing the task using a second application that is different than the first application, wherein the context data is applied to the second application to reproduce the aspects of the first user experience in the second user session.

6. The system of claim 1 further comprising
a user interface associated with the access control manager and comprising a control panel configured to enable a user configure the set of access parameters, and wherein the set of access parameters are configured by a user associated with the first user computing device, using the user interface.

7. The system of claim 1, wherein the access parameters comprise rules, conditions, permissions, or other logic for accessing the context data on the data store, and wherein the context data is stored on the data store in a user account associated with a user of the first user computing device.

8. The system of claim 7, wherein the access parameters includes conditions specifying access to the context data based on one or more of: a geographical location of the user computing device requesting access to the context data; a duration of time for which access to the context data is permitted; a historical record of previous requests for context data from the computing device requesting access to the context data; a registration record of the computing device requesting access to the context data; the type of computing device requesting access to the context data; and a category of the task performed on the computing device requesting access to the context data or a category or the application or service for carrying out the task.

9. The system of claim 1, wherein the schema specifies a data structure for representing the context data comprising a set of data elements characterizing aspects of the task or the first user experience.

10. The system of claim 1, further comprising:
an analytics component configured to analyze the set of context data and other context data associated with users of other computing devices; and
based on an analysis of the context data and other context data associated with the other users:
(a) determining a recommendation of an application for carrying out a first task associated with the first user session, and communicating the recommendation with the subset of context data to the second user computing device; or
(b) determining or modifying the schema.

11. A computer-performed method for replicating a context of a user experience, from a first user computing device, on a second user computing device configured differently than the first user computing device, the method comprising:
monitoring the second user computing device to determine a task performed by an application in a user session on the second user computing device;
based on the determined task, generating a request for a set of context data corresponding to the task, the request including information identifying the task and information identifying the second user computing device or a user associated with the second user computing device;
sending the request for the set of context data to a server associated with a data store containing contextual information from the user experience from first user computing device, the server controlling access to the contextual information based on a set of access parameters;
receiving a subset of the context data from the server, the subset of the context data determined by the server based on at least the request and the set of access parameters; and
utilizing the subset of context data on the second user computing device to replicate the context of the user experience from the first user computing device in the user session on the second user computing device.

12. The method of claim 11, wherein monitoring the second user computing device to determine a task performed by an application comprises monitoring sensor data provided by one or more sensors associated with the second user computing device.

13. The method of claim 11 further comprising:
receiving an authentication challenge from the server in response to sending the request; and
providing credentials to the server in response to the authentication challenge, wherein the subset of the context data is further determined based on the credentials.

14. The method of claim 11, wherein the received subset of context data comprises a data structure defined according to a schema corresponding to the task, the data structure and including data elements characterizing aspects of the context of the user experience from the first user computing device.

15. The method of claim 11, wherein the request is generated based on an API associated with the server and wherein the request is sent to the server using REST over HTTP(s).

* * * * *